(12) United States Patent
Bracken et al.

(10) Patent No.: US 12,002,125 B2
(45) Date of Patent: Jun. 4, 2024

(54) PROVISIONING AN ESCROW USER ACCOUNT FOR TRACKING LEARNING PROGRESS OF AN END USER OF A CLOUD COMPUTING PLATFORM WHILE INTERACTING WITH VIRTUAL LEARNING ENTITIES OF THE CLOUD COMPUTING PLATFORM THAT REPRESENT CONTENT OF AN EXTERNAL LEARNING APPLICATION

(71) Applicant: Salesforce, Inc., San Francisco, CA (US)

(72) Inventors: John Bracken, San Francisco, CA (US); Adam Putinski, San Francisco, CA (US); Adam Torman, San Francisco, CA (US); Carlos Enrique Mogollan Jimenez, San Francisco, CA (US); Cloves Carneiro Junior, Hollywood, FL (US); Shaun Russell, South Kingstown, RI (US)

(73) Assignee: Salesforce, Inc.

( * ) Notice: Subject to any disclaimer, the term of this patent is extended or adjusted under 35 U.S.C. 154(b) by 238 days.

(21) Appl. No.: 17/447,917

(22) Filed: Sep. 16, 2021

(65) Prior Publication Data
US 2022/0092713 A1 Mar. 24, 2022

Related U.S. Application Data

(60) Provisional application No. 63/080,608, filed on Sep. 18, 2020.

(51) Int. Cl.
*G06Q 50/20* (2012.01)
*G06F 9/451* (2018.01)
(Continued)

(52) U.S. Cl.
CPC ......... *G06Q 50/2057* (2013.01); *G06F 9/451* (2018.02); *G06F 9/547* (2013.01);
(Continued)

(58) Field of Classification Search
CPC ....... G06Q 10/00–50/00; H04L 1/00–2212/00; G06F 1/00–2123/00
(Continued)

(56) References Cited

U.S. PATENT DOCUMENTS 5,577,188 A 11/1996 Zhu
5,608,872 A 3/1997 Schwartz et al.
(Continued)

*Primary Examiner* — Alan S Miller
(74) *Attorney, Agent, or Firm* — Lorenz & Kopf, LLP

(57) ABSTRACT

Technologies are provided for tracking learning progress of an end user of a cloud computing platform when the end user is not registered with an external learning platform that provides an external learning application. In response to the end user interacting with virtual learning entities provided at the cloud computing platform, learning progress information with respect to the external learning application is generated. When a user service of the external learning platform receives a request to persist the learning progress information for the end user, the user service can determine whether a corresponding user account exists at the external learning platform that corresponds to the end user. If a corresponding user account does not exist, the user service can automatically provision an escrow user account that is associated with the end user. The escrow user account persists the learning progress information of the end user.

20 Claims, 13 Drawing Sheets

(51) Int. Cl.
*G06F 9/54* (2006.01)
*G06Q 10/105* (2023.01)
*G06Q 30/0201* (2023.01)
*H04L 67/00* (2022.01)
*H04L 67/561* (2022.01)
*H04L 67/567* (2022.01)

(52) U.S. Cl.
CPC ......... *G06Q 30/0201* (2013.01); *H04L 67/34* (2013.01); *H04L 67/561* (2022.05); *H04L 67/567* (2022.05); *G06Q 10/105* (2013.01)

(58) Field of Classification Search
USPC .............................................. 705/7.11–7.42
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,131,713 B2 * | 3/2012 | Weissman ............ G06F 16/2462 707/718 |
| 8,209,308 B2 | 6/2012 | Rueben et al. |
| 8,244,759 B2 * | 8/2012 | Brooks ................ G06F 16/289 707/782 |
| 8,275,836 B2 | 9/2012 | Beaven et al. |
| 8,332,437 B2 * | 12/2012 | Ballard ............ G06F 16/24575 707/795 |
| 8,457,545 B2 | 6/2013 | Chan |
| 8,473,518 B1 * | 6/2013 | Yancey ................ G06F 21/604 707/786 |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,839,388 B2 * | 9/2014 | Raleigh ................ H04W 8/20 726/7 |
| 8,955,080 B2 * | 2/2015 | Brunswig ............ H04L 63/0815 726/8 |
| 10,460,313 B1 * | 10/2019 | Clark .................. H04L 63/0815 |
| 10,564,961 B1 * | 2/2020 | Braun ..................... H04L 67/10 |
| 11,132,116 B2 * | 9/2021 | Rathod ................ G06F 3/04847 |
| 11,263,229 B1 * | 3/2022 | Basavaiah ........... G06F 16/2477 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0111942 A1 * | 8/2002 | Campbell ............ G06F 16/958 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |

(56) References Cited

U.S. PATENT DOCUMENTS

| | | |
|---|---|---|
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0086482 A1* | 4/2008 | Weissman ........... G06F 16/2365 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0091171 A1* | 4/2013 | Lee .................... H04L 63/0815 |
| | | 707/E17.001 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0326511 A1* | 11/2015 | Chiu .................. H04L 51/214 |
| | | 726/7 |
| 2018/0095613 A1* | 4/2018 | Ready .................. H04L 63/083 |
| 2018/0096130 A1* | 4/2018 | Purkiss .................. G06F 21/45 |
| 2018/0113684 A1* | 4/2018 | Dawson .................. G06F 8/36 |
| 2018/0278494 A1 | 9/2018 | Chen et al. |
| 2022/0092713 A1* | 3/2022 | Bracken ............... H04L 67/567 |

\* cited by examiner

PROVISIONING AN ESCROW USER ACCOUNT FOR TRACKING LEARNING PROGRESS OF AN END USER OF A CLOUD COMPUTING PLATFORM WHILE INTERACTING WITH VIRTUAL LEARNING ENTITIES OF THE CLOUD COMPUTING PLATFORM THAT REPRESENT CONTENT OF AN EXTERNAL LEARNING APPLICATION

CROSS-REFERENCE TO RELATED APPLICATIONS

This application claims the benefit of U.S. Provisional Application No. 63/080,608, filed Sep. 18, 2020, which is incorporated herein by reference in its entirety. The present application is related to co-pending application Ser. No. 17/447,889, titled "INTEGRATING LEARNING DATA PROVIDED BY AN EXTERNAL LEARNING PLATFORM TO CREATE A CUSTOM LEARNER EXPERIENCE WITHIN THE CONTEXT OF AN APPLICATION PROVIDED BY A CLOUD COMPUTING PLATFORM," also filed on Sep. 16, 2021, by inventors Shaun Russell, which is incorporated herein by reference in its entirety.

TECHNICAL FIELD

Embodiments of the subject matter described herein relate generally to cloud computing platforms, and more particularly, embodiments of the subject matter relate to systems, methods and a learning platform architecture (LPA) for provisioning an escrow user account for tracking learning progress of an end user of a cloud computing platform while interacting with virtual learning entities of the cloud computing platform that represent content of an external learning application.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have need for expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

Learning to use applications and services provided by a cloud computing platform can be time consuming for end users. In one approach to help facilitate learning within a cloud computing platform, a third-party, external learning platform that is independent of the cloud computing platform may provide learning content and data to the cloud computing platform, and a platform developer can build their own UI (e.g., representation of the learning content and data) without importing the application functionality and style of the application at the external learning platform. This can allow an end user or "learner" to learn within the context of an application provided by the cloud computing platform, but the end user will not have the same user experience as they would if interacting with a learning application provided by the external learning platform. In most cases, the look and feel, application functionality, information architecture, interaction behavior, style and/or branding from the external learning application provided by the external learning platform will be different than if the end user were interacting with the learning application provided by the external learning platform.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
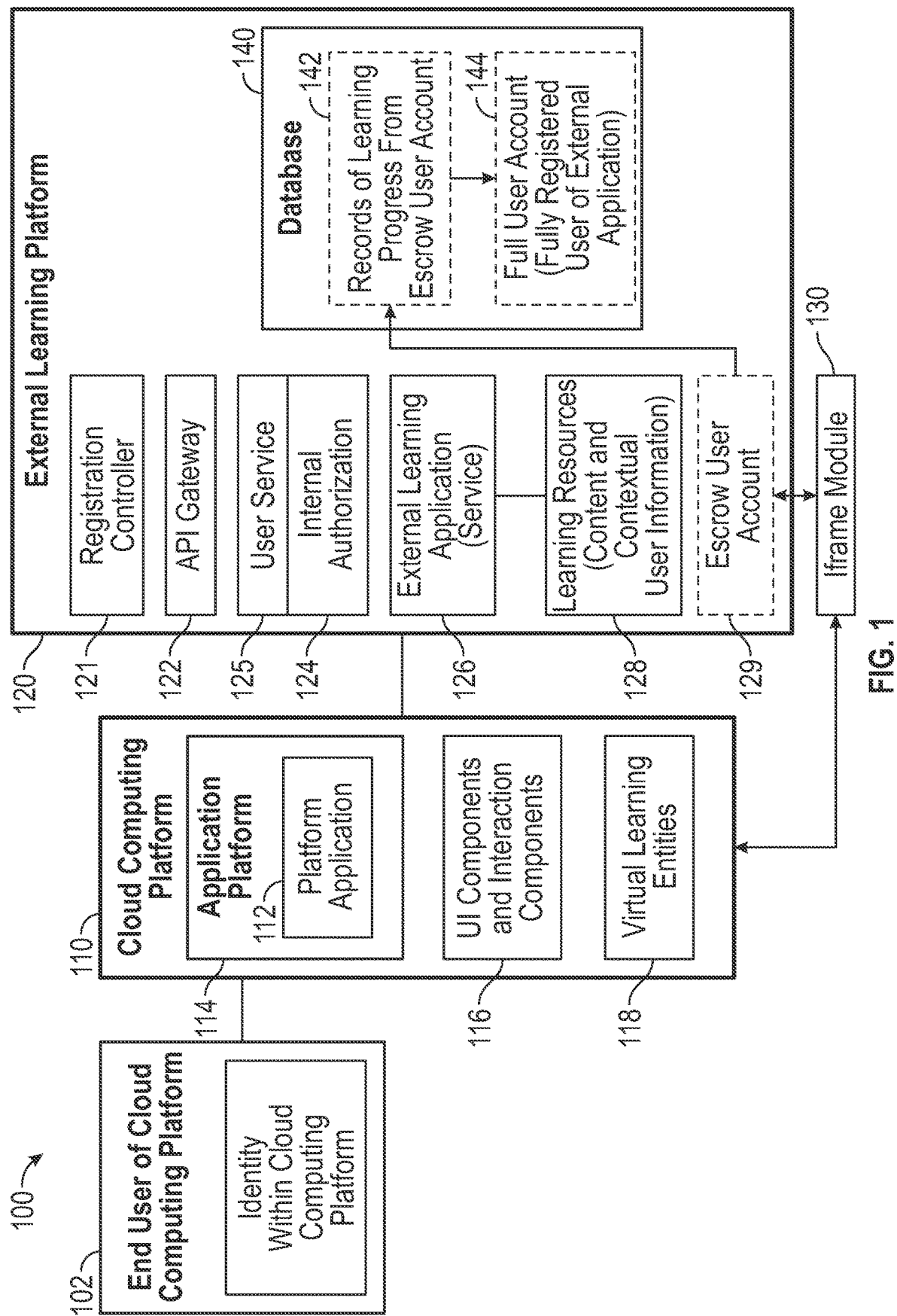
FIG. 1 is a block diagram that illustrates a system for integrating learning objects from an external learning platform at a cloud computing platform in accordance with the disclosed embodiments.

It would be desirable to provide technologies and technological solutions that can allow for a core cloud computing platform to enable in-application learning using learning content from a third-party, external learning platform. It would also be desirable to provide technologies that can allow for integration of content provided by external learning platforms within the core cloud computing platform. It would also be desirable to provide a cloud computing platform, that provides clients with CRM applications and services, with the ability to integrate learning within the cloud computing platform and to leverage data from external learning platforms (e.g., content sources and data sources). For instance, one commonly used core cloud computing platform is Salesforce.com®. It would be desirable to provide technological solutions that can allow for the Salesforce.com® platform by leveraging learning content and data provided by an external learning platform or data source, such as Trailhead.com®, so that it can be utilized within the core cloud computing platform to enable in-application learning.

The disclosed embodiments can provide systems, methods and a learning platform architecture (LPA) for integrating learning objects from an external platform within a flow of work at a cloud computing platform. The LPA can be implemented at a core cloud computing platform that provides platform applications(s) (e.g., productivity application(s)) to end users and a third-party learning platform that is external to the core cloud computing platform, which will be referred to below as an external learning platform. The LPA can teach users how to use the platform applications provided by the core cloud computing platform while working within and without leaving the core cloud computing platform. For example, in one implementation, the disclosed embodiments can provide a platform in a core cloud computing platform such as Salesforce.com® to enable in-application learning using an external learning platform, such as Trailhead.com® to provide learning experiences for users of Salesforce.com® within the flow of their work within an application provided by the core cloud computing platform. Learning in the flow of work allows for learning to fit around and align itself to working days and working lives of the users and provides learning content to users while working within applications provided by the core cloud computing platform. By delivering learning in a flow of a user's work, this helps users learn more efficiently with contextually relevant prompts and automated learning journeys surfaced within Salesforce. This can reduce time away from work tasks by allowing for learning to take place within the flow of the user's work within.

Providing systems, methods and the learning platform architecture (LPA) described above presents several technical challenges due to lack of integration between the cloud computing platform and the external learning platform.

One drawback of this approach is that as learning progress is made by end users of the cloud computing platform, while interacting with the learning content at the cloud computing platform, is that there is no automated way to track learning progress of the end user within the context of the external learning application (provided at the external learning platform) because it is independent from and not integrated with the cloud computing platform. When the cloud computing platform is used to interact with learning content provided by the external learning application, one options is for the end user of the cloud computing platform to establish an account in the external learning application to capture progress. This requires the end user to go through a full registration and sign-up process with the external learning application, but in many cases the end user is unwilling to make this effort. Another option is to duplicate learning progress information at the cloud computing platform and then attempt to synchronize it at the external learning application as learning progress information is updated, but this approach is cumbersome, time-consuming and prone to error (e.g., when learning progress information is not synchronized on a regular basis there can be gaps in the learning progress information that is stored at the external learning application).

In order to avoid requiring the cloud computing platform user to go through the full registration and sign-up process with the external learning application, the disclosed embodiments can provide a just-in-time user provisioning process that can create an escrow user account when the end user of the cloud platform interacts with learning content. The escrow user account is linked to the end user's identity at the cloud computing platform, and subsequent interactions by the end user with virtual learning entities at the cloud computing platform are captured via the escrow user account. This way, learning progress by the end user (e.g., learning progress information), who is working within the context of an application at the cloud computing platform, can be tracked and maintained and is not lost even though the end user has not fully registered with and signed up for a full user account with the external learning application. This can be beneficial to the end user since it does not require them to unnecessarily repeat learning tasks, activities, and modules that they have already completed. From the perspective of the external learning platform, the end user of the cloud computing does not need to undergo a registration and sign-up process when the escrow user account is created, and their learning progress information will still be logged and maintained in the escrow user account. Once the end user of the cloud computing platform completes the full registration and sign-up process with external learning platform/application, the escrow user account can be identified using the end user's identity at the cloud computing platform, and any learning progress information maintained via the escrow user account based on the end user's interactions with learning content at the cloud computing platform can then be transferred and assigned to the new, full user account at the external learning platform.

In accordance with the disclosed embodiments, systems and methods are provided that can allow for creation of different user accounts (e.g., profiles) for tracking learning progress of an end user of the cloud computing platform while interacting with content of an external learning application (e.g., learning content and contextual user information). The systems and methods can allow for "just-in-time" provisioning of user accounts within an external learning platform when user accounts do not already exist in the external learning platform.

In one embodiment, technologies are provided for tracking learning progress of an end user of a cloud computing platform when the end user is not registered with an external learning platform that provides an external learning application. Learning progress information with respect to the external learning application can be generated when an end user interacts with virtual learning entities provided at the cloud computing platform. The interaction by the end user takes place in the context of an application provided by the cloud computing platform while in an active web session. The virtual learning entities provided by the cloud computing platform represent learning content and contextual user information of the external learning application. For example, the virtual learning entities provide a framework for integrating learning content and contextual user information from the external learning application, and describe a logical schema for learning content and contextual user information in the cloud computing platform. Examples of contextual user information can include any information about the user's relationship with the learning data including, but not limited to, learning lists which are user specified lists of learning content. An end user can have many learning lists. Each learning list can have many learning items. An end user has relationships with each learning list, such as, learning or "learner" progress, learning start date time that specifies the date and time started, learning completed date and time that specifies when the learning module was completed, learning time remaining to complete, learning reward information, learning submission attempt dates and times, learning submissions, modules bookmarked by an end user, modules favorited by an end user, etc. Examples of learning progress information can include, but are not limited to, status of completion of a learning module by the end user; points or rewards earned by the end user for completion of a learning module; one or more user interactions to be persisted that are indicative of learning progress; information regarding existing learning badges and points that the end user has earned, etc.

When a user service of the external learning platform receives a request to persist the learning progress information for the end user, the user service can determine whether a corresponding user account (i.e., an escrow user account or a full user account) exists at the external learning platform that corresponds to the end user. As used herein, the term "user account" can refer to a database entity or object that is associated with an identity of a user and that stores information associated with the user, such as learning progress information as described herein. An "escrow user account" can refer to a user account whose purpose is to capture learning progress information, learning platform progress and interactions, etc. An escrow user account can be identified by a user account's identity within a cloud computing platform. An escrow user account is not a complete of full user account and cannot be used to sign in to an external learning application directly. By contrast, a "full user account" can refer to a user account where the user has explicitly signed up with an external learning application. A full user account can be resolved and used by a cloud computing platform to track user interactions and progress in an external learning application. This account can also be used to sign in to the external learning platform directly.

If a corresponding user account does not exist, the user service can automatically provision an escrow user account that is associated with the end user. The escrow user account persists the learning progress information of the end user. The escrow user account is created "just-in-time" meaning that the escrow user account is not created until there is a need to persist the learning progress of the end user, and once created, the escrow user account persists the learning progress information associated with the end user to track the user's learning progress and interaction with content of the external learning application as provided via the virtual learning entities at the cloud computing platform (e.g., learning content and contextual user information of the external learning application). This way, learning progress by the end user, who is working within the context of an application at the cloud computing platform, can be tracked, maintained and not lost. This can be beneficial to the end user since it does not require them to unnecessarily repeat learning tasks, activities, and modules that they have already completed.

After the escrow user account is automatically provisioned, an API gateway of the external learning platform can establish a session with the user service, and whenever there is a need to persist further or additional learning progress of the end user (as the end user interacts with the with virtual learning entities), the escrow user account can capture the further learning progress information of the end user until the end user becomes a fully registered user at the external learning platform, and establishes a full user account.

When the end user of the cloud computing platform registers a full user account with the external learning application of the external learning platform, the user service can receive a notification, and, in response, the user service can retrieve learning progress information for the end user that has been maintained at or by the escrow user account, and can populate (or hydrate) the full user account at the external learning platform with the learning progress information for the end user that was retrieved from the escrow user account. Thereafter, the full user account can capture further learning progress information that happens after the end user registers the full user account of the external learning platform. Further details regarding the disclosed embodiments are provided in U.S. Provisional Application No. 63/080,608, filed Sep. 18, 2020, which is incorporated herein by reference in its entirety. Examples of systems and methods in accordance with the disclosed embodiments will now be described with reference to FIGS. 1-7.

FIG. 1 is a block diagram that illustrates a system 100 for integrating learning objects (e.g., learning content and contextual user information of the external learning application) from an external learning platform 120 at a cloud computing platform 110 in accordance with the disclosed embodiments.

The core cloud computing platform 110 includes an application platform 114 that provides one or more platform applications 112 (e.g., productivity application(s)) to one or more end users 102. Examples of a cloud computing platform like this will be described below with reference to FIGS. 8-11B. A specific, non-limiting example of such a cloud computing platform is Salesforce.com®; however, it should be appreciated that the cloud computing platform could include other platforms such as SAP®, Oracle®, etc. In one embodiment, the core cloud computing platform 110 can be a customer relationship management (CRM) platform such as Salesforce.com®'s Lightning® Platform (also known as Force.com). The Lightning Platform is a platform as a service (PaaS) that allows developers to create add-on applications that integrate into the main Salesforce.com® application. These third-party applications are hosted on Salesforce.com®'s infrastructure. Force.com applications are built using declarative tools, backed by Lightning® and Apex®, a proprietary Java-like programming language for Force.com®, as well as and Visualforce®, a framework including an XML syntax typically used to generate HTML.

The external learning platform 120 is a third-party learning platform that is external to the core cloud computing platform 110. The external learning platform 120 can provide at least one external learning application 126 (or service) that teaches users how to use the platform applications 112 provided by the core cloud computing platform 110. In one embodiment, the external learning platform 120 can be a learning platform, such as Salesforce.com's Trailhead®. Trailhead® is an online learning (or training) platform that can be customized for the specific needs of its customers. The Trailhead® platform extends functionality which Salesforce.com® built to provide users with training content specific to their usage of Salesforce.com® and enables users to create and publish their own training content and programs. Other non-limiting examples of external learning platforms can include, for example, Trailhead.com®, Microsoft Learn®, Microsoft CRM Dynamics®, SAP Concur Expenses®, Workday HRMS®, Cornerstone On-Demand®, Instructure®, and Lessonly®, etc.

In one embodiment, the external learning platform 120 can be implemented using cloud PaaS, such as Heroku, which is a container-based cloud platform as a service (PaaS) that supports several programming languages. Heroku enables developers to build, run, and operate applications entirely in the cloud. Developers use Heroku to deploy, manage, and scale modern apps. Heroku supports multiple programming languages, such as the Ruby programming language, Java, Node.js, Scala, Clojure, Python, PHP, and Go. For this reason, Heroku is a polyglot platform as it has features for a developer to build, run and scale applications in a similar manner across most languages. The Heroku network runs the customer's apps in virtual containers which execute on a reliable runtime environment. Heroku calls these containers "Dynos." Applications that are run on Heroku typically have a unique domain used to route HTTP requests to the correct application container or dyno. Each of the dynos are spread across a "dyno grid" which consists of several servers. These dynos can run code written in Node, Ruby, PHP, Go, Scala, Python, Java, or Clojure. Heroku also provides custom buildpacks with which the developer can deploy apps in any other language. Heroku lets the developer scale the app instantly just by either increasing the number of dynos or by changing the type of dyno the app runs in.

The external learning platform 120 includes a registration controller 121, a system-level API gateway 122, a user service 125 that can implement a unified internal authorization module 124 that performs user authentication and user identification and also provision users, at least one external learning application (or service) 126 and associated learning resources 128 (e.g., learning content and contextual user information), and a relational database management system 140 that can be implemented as part of external learning platform 120 or externally to the external learning platform 120. The API gateway 122 is an API service that operates at the network perimeter of the external learning application 126. Based on the nature of requests that come from the cloud computing platform, the API Gateway 122 translates and federates the API request to internal services (e.g., user service 125 and learning resources 128), processes the results and services the request from the cloud computing platform 110.

The external learning application 126 is an independent system of learning that can be used outside of the context of another platform, such as cloud computing platform 110. The external learning application 126 can be or can be part of a learning management system (LMS). A LMS is a software application for the administration, documentation, tracking, reporting, automation and delivery of educational courses, training programs, or learning and development programs. A LMS can deliver and manage all types of content, including video, courses, and documents. A LMS can be designed to identify training and learning gaps, utilizing analytical data and reporting. A LMS can focus on online learning delivery but support a range of uses, acting as a platform for online content, including courses, both asynchronous based and synchronous based (e.g., users can either learn asynchronously (on demand, self-paced) through course content such as pre-recorded videos, PDFs, Sharable Content Object Reference Model (SCORM) or they can undertake synchronous learning through mediums such as Webinars). A LMS may be used to create structured course content. For example, an administrator, teacher or developer of a LMS can add, text, images, videos, pdf files, tables, links and text formatting, interactive tests, slideshows, etc. Moreover, they can create different types of users or learners using role-based hierarchies. This can help control which content a learner can access, track studying progress and engage learners with contact tools. An administrator, teacher, employer, etc. can manage courses and modules, enroll learners or set up self-enrollment.

A LMS can include intelligent algorithms to make automated recommendations for courses based on a user's skill profile as well as extract metadata from learning materials in order to make such recommendations even more accurate. Through a LMS, an administrator, teacher, employer, developer, etc. may create and integrate course materials, articulate learning goals, align content and assessments, track studying progress, and create customized tests for learners. A LMS allows the communication of learning objectives, and organize learning timelines. In some implementations, a LMS can allow learners to exchange feedback both with teachers and their peers. For instance, discussion groups can be created to allow learners to provide feedback, share their knowledge on topics and increase the interaction in course.

A LMS can deliver learning content and tools straight to learners, and assessments can be automated. An LMS can enable creation of automated assessments and assignments for learners, which are accessible and submitted online. Most platforms allow a variety of different question types such as: one/multi-line answer; multiple choice answer; ordering; free text; matching; essay; true or false/yes or no; fill in the gaps; agreement scale and offline tasks.

Thus, a LMS can have built-in customizable features including assessment and tracking. A LMS can incorporate dashboards to track learners' progress, and then report on key items such as completion rates, attendance data and success likelihood. Utilizing these metrics can help facilitators better understand gaps in user knowledge. Learners can see in real time their progress and instructors can monitor and communicate the effectiveness of learning. Besides facilitating online learning, a LMS can track learning progress, provide digital learning tools, manage communication, etc.

Among other things, the relational database management system 140 can store data or records 142 regarding end user's usage of the external learning application 126 (via the virtual entities), and information regarding their learning progress (or learning progress information). This information can be obtained via an escrow user account 129 and/or stored at a full user account 144. In one implementation, the database 140 can be implemented using Heroku Postgres, which is the Cloud database (DBaaS) service for Heroku based on PostgreSQL. Heroku Postgres provides features like continuous protection, rollback, high availability. The various elements of the external learning platform 120 will be described in greater detail below.

Depending on the implementation, the iFrame module 130 can be implemented externally to the external learning platform 120 or as part of the external learning platform 120. The iFrame module 130 allows for the external learning platform 120 to communicate with the application 112 provided by the cloud computing platform 110. The iFrame module 130 is the web UI container used by the cloud computing platform 110 for bringing specific UI interactions from the external learning application 126 into the cloud computing platform 110. For example, taking an assessment or quiz inside the cloud computing platform 110 is a UI interaction hosted by and imported from the external learning application 126.

In accordance with the disclosed embodiments, the external learning application 126 of the external learning platform 120 can serve as a source of learning resources 128 (e.g., learning content and contextual user information) that are provided at the core cloud computing platform 110 via user interface components and hosted interaction components 116 and a virtual learning entity framework that includes virtual learning entities 118. The virtual learning entity framework defines virtual learning entities/objects 118 at the core cloud computing platform 110 that allow remote learning content and data 128 (e.g., Trailhead data) from the external learning platform 120 to be exposed at the core cloud computing platform 110 as objects (e.g., standard objects (SObjects)) and used for re-creating aspects of a profile within the platform application 112 (e.g., providing award count information to a Chatter profile page). As an architectural construct in the cloud computing platform 110, a virtual learning entity describes a logical schema for data in the cloud computing platform 110 and provides a framework for integrating data from an external learning application 126. In this case, the virtual learning entities 118 represent the logical schema of the learning content, progress and related data. The virtual learning entities 118 represent learning resources 128 of the external learning application 126 that is provided by the external learning platform 120 (e.g., learning content and contextual user information of the external learning application 126). The end user 102 can interact with the virtual learning entities 118 provided at the cloud computing platform 110 to learn content that has been integrated from the external learning application 126 (provided by external learning platform 120), all while working within the context of a platform applications 112 and without leaving the core cloud computing platform 110. In some embodiments, the interaction by the end user 102 takes place in the context of the platform application 112 provided by the cloud computing platform 110, for example, while in an active web session.

For example, in one implementation, the disclosed embodiments can enable in-application learning at a core cloud computing platform 110, such as Salesforce.com®, using an external learning platform 120, such as Trailhead.com®, to provide learning experiences for end users 102 of the cloud computing platform 110 within the flow of their work and/or within the context of the platform application 112 provided by the application platform 114 of the core cloud computing platform 110. For instance, the system 100 can enable, for example, a user experience that allows an admin or end user 102 to learn while they work within a platform application 112 (e.g., a CRM productivity application). The system 100 can also enable a user experience that allows one party to (e.g., a manager and employee, such as, a service (call) center supervisor and agent) to interact with other end users within the context of a Workforce Engagement Management framework to assign learning tasks to the end users.

Just-In-Time User Provisioning

As the end user 102 interacts with the virtual learning entities 118, the end user 102 can make learning progress with respect to the external learning application 126. This learning progress can be summarized in various ways by different types of learning progress information that is generated by the virtual learning entities 118 (e.g., information regarding the end user's learning progress). Examples of learning progress information can include, but are not limited to, status of completion of a learning module by the end user 102 including whether a learning module or project has been completed (e.g., time finished at, estimated time left, percentage complete, etc.); points or rewards earned by the end user 102 for completion of a learning module; user interactions to be persisted that are indicative of learning progress toward completing a learning module (e.g., their status in completing learning module); information regarding existing learning badges and points that the end user 102 has earned; ranking(s) of the end user; and/or other learning progress information.

It is desirable to track the learning progress information of the end user 102. In some cases, the end user 102 may have fully registered with and has an identity within the external learning platform 120 (in addition to a different identity within cloud computing platform 110) so that their learning progress can be tracked and maintained. However, in other cases, the end user 102 may not have registered with the external learning platform 120 so there is no way to track their learning progress information.

In accordance with the disclosed embodiments, technologies are provided for tracking learning progress of the end user 102 when the end user 102 is not registered with the external learning platform 120 that provides the external learning application 126. An escrow user account 129 can be created for tracking the end user's 102 learning progress even though the end user 102 is not a fully registered user with the external learning platform 120 and has not yet established a full user account 144.

To explain further, when a user service 125 of the external learning platform 120 receives a request to persist the learning progress information for the end user 102, the user service 125 can determine whether a corresponding user account that corresponds to the end user 102 (i.e., an escrow user account 129 or a full user account 144) exists at the external learning platform 120. If a corresponding user account does not exist, the user service 125 can automatically provision an escrow user account 129 that is associated with the end user 102. The escrow user account 129 persists the learning progress information of the end user 102. The escrow user account 129 is created "just-in-time" meaning that the escrow user account 129 is not created until there is a need to persist the learning progress of the end user 102, and once created, the escrow user account 129 persists the learning progress of the end user 102 to track the user's learning progress and interaction with content of the external learning application 126 as provided via the virtual learning entities 118 at the cloud computing platform 110 (e.g., learning content and contextual user information of the external learning application 126). This way, learning progress by the end user 102 (e.g., learning progress information), who is working within the context of an application 112 at the cloud computing platform 110, can be tracked and maintained and is not lost even though the end user has not fully registered with and signed up for a full user account with the external learning application. This can be beneficial to the end user 102 since it does not require them to unnecessarily repeat learning tasks, activities, and modules that they have already completed.

After the escrow user account 129 is automatically provisioned, an API gateway of the external learning platform 120 can establish a session with the user service 125, and whenever there is a need to persist further or additional learning progress of the end user 102 as the end user 102 interacts with the with virtual learning entities 118, the escrow user account 129 can capture the further learning progress information of the end user 102 until the end user 102 becomes a fully registered user with the external learning application 126 of the external learning platform 120, which will be referred to herein as a full user account 144.

When the end user 102 of the cloud computing platform 110 registers a full user account 144 with the external learning application 126, the user service 125 can receive a notification, and, in response, the user service 125 can retrieve learning progress information for the end user 102 that has been maintained at (or by) the escrow user account 129, and can populate (or hydrate) the full user account 144 at the external learning platform 120 with the learning progress information for the end user 102 that was retrieved from the escrow user account 129. Thereafter, the full user account 144 can capture further learning progress information that happens after the end user 102 has registered the full user account 144.

As such, the system 100 can provide a learning platform architecture (LPA) that allows for provisioning an escrow user account 129 that tracks learning progress of the end user 102 of the cloud computing platform 110 while the end user 102 is interacting with virtual learning entities 118 that represent content of an external learning application 126. As will be described below with reference to FIGS. 2-7, the user service 132 can create or "provision" the user account 129 just-in-time when one does not already exist for the end user 102 at the external learning platform 120 so that learning progress information of the end user 102 can be persisted without having to be registered with the external learning platform 120.

FIGS. 2-7 are flow charts and dataflow diagrams that illustrates examples of methods in accordance with the disclosed embodiments. With respect to FIGS. 2-7, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method so long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIGS. 2-7 that follows, elements mentioned above in connection with FIG. 1 can be described as performing various acts, tasks or steps, but it should be appreciated that this refers to processing system(s) of these entities executing instructions to perform those various acts, tasks or steps and interacting with other elements of the system 100. Depending on the implementation, some of the processing system(s) can be centrally located, or distributed among a number of server systems that work together.

Figure 2:
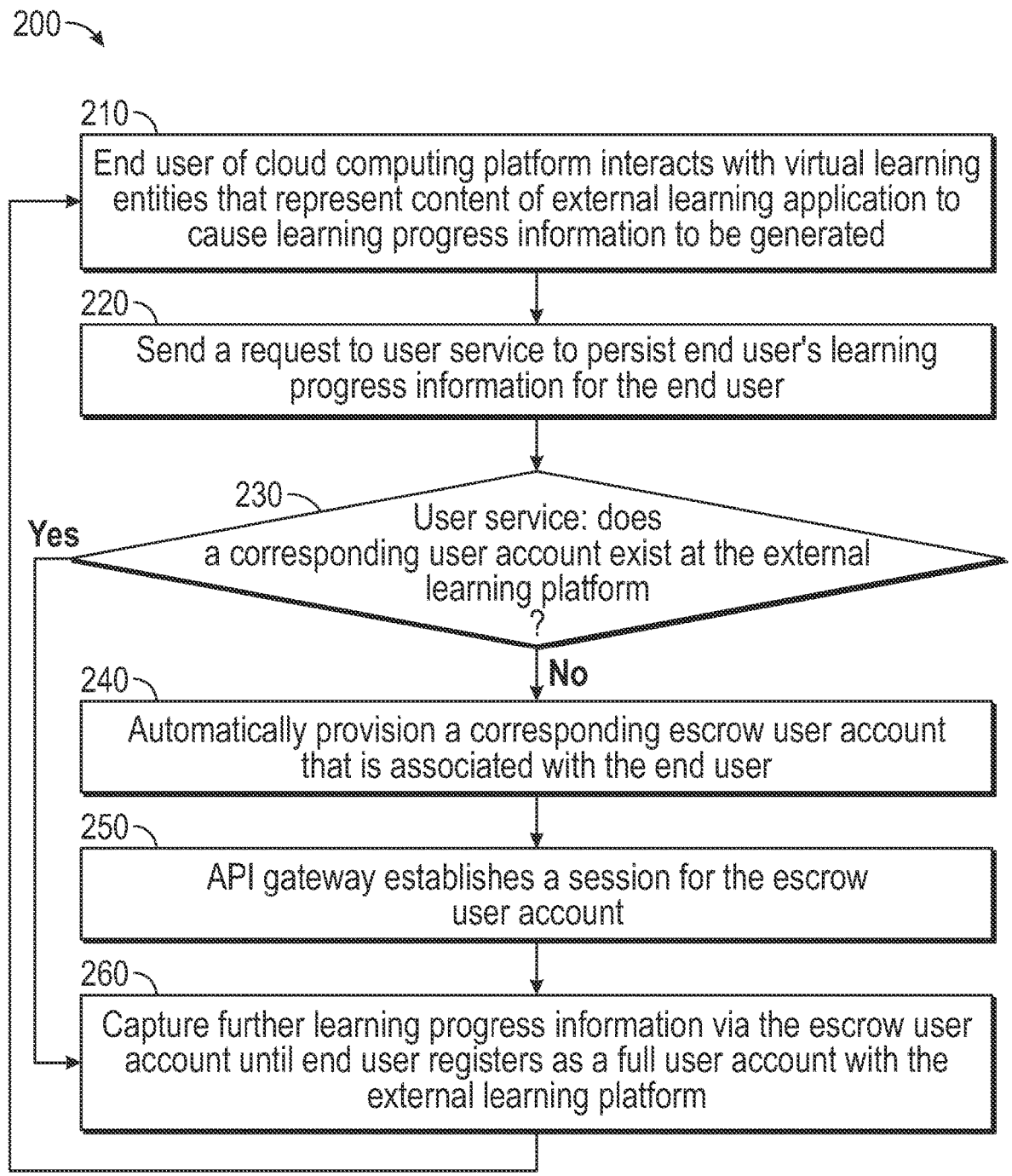
FIG. 2 is a flow chart that illustrates a method for tracking learning progress of an end user of a cloud computing platform while interacting with virtual learning entities of the cloud computing platform that represent content of an external learning application in accordance with the disclosed embodiments.

FIG. 2 is a flow chart that illustrates a method 200 for tracking learning progress of an end user 102 of a cloud computing platform 110 while interacting with virtual learning entities 118 of the cloud computing platform that represent content of an external learning application 126 in accordance with the disclosed embodiments.

The method 200 begins at 210, where the end user 102 of the cloud computing platform 110 is in an active web session and interacting with virtual learning entities 118 that represent content of the external learning application 126. The virtual learning entities 118 can include the learning data and have attributes expected by user interface components. The learning data can include, for example, learning content and contextual user information. The end user's interaction at 210 causes learning progress information to be generated in response to interaction with virtual learning entities 118.

In one embodiment, the interaction takes place in the context of an application provided by the cloud computing platform while in an active web session. For instance, as one non-limiting example of step 210, the end user 102 may be interacting with learning content in taking a quiz provided by an external learning platform 120 while within the context of a platform application 112 of the cloud computing platform 110.

At 220, a request is sent to the external learning platform 120 to persist the end user's learning progress information that is generated based on end user's interaction(s) with virtual learning entities. To explain further, when the end user 102 interacts with the virtual learning entities 118 this can cause an HTTP request to be generated at 220 (e.g., a submission when the user's interactions are of the type that would cause learning progress information to be generated that is normally tracked and persisted via the external learning application 126). The HTTP request gets sent from the cloud computing platform 110 to API gateway 122 of the external learning platform 120, where it is interpreted as a request to persist the end user's interaction(s) to track his/her learning progress within the external learning application 126.

At 230, the user service 125 determines whether a corresponding user account exists at the external learning platform that corresponds to the end user. Depending on what has previously happened, the corresponding user account may not yet exist, or may have already been established as an escrow user account 129 or a full user account 144. For instance, in one scenario, it can be determined whether a record for an escrow user account 129 (or full user account 144) exists at the database 140 of external learning platform that is mapped to the end user 102.

When the user service 125 determines (at 230) that a corresponding escrow user account 129 exists, the method 200 proceeds to 260. When the user service 125 determines (at 230) that a corresponding user account does not exist, the method 200 proceeds to 240, where the user service 125 automatically provisions a corresponding escrow user account 129 (that is associated with the end user 102), and creates a record at the database system 140 to persist the learning progress information for the end user 102 (made via virtual learning entities 118 with respect to the external learning application 126) at the escrow user account 129, and returns a user object to the API gateway 122. The escrow user account 129 is not created until there is a need to persist the end user's learning progress.

The method 200 then proceeds to 250, where the API gateway 122 establishes a session with the user service 125. At 260, as the end user 102 interacts with the with virtual learning entities 118 that represent content of the external learning application 126, whenever there is a need to persist the end user's further learning progress, HTTP requests will be generated at the cloud computing platform 110 and communicated to the external learning platform 120, where the escrow user account 129 captures the further learning progress information (e.g., learning module status and/or completion) of the end user 102. The escrow user account 129 will continue to capture the end user's learning progress information until the end user 102 registers as a full user account 144 (and becomes a "fully registered" user) with the external learning application 126 of the external learning platform 120.

As will be explained below with reference to FIGS. 5-7, for example, after the end user 102 registers as a full user account 144, the escrow user account 129 is no longer needed because the end user's learning progress information can then be captured by the full user account 144 of the external learning platform 120. The end user 102 has an identity at the cloud computing platform 110, and the escrow user account 129 at the external learning platform 120 can be mapped to the identity of the end user 102 at the cloud computing platform 110. Likewise, the full user account 144 can also be mapped to the identity of the end user 102 at the cloud computing platform 110.

Once the user service 125 is notified that the end user 102 has registered a full user account 144 with the external learning application 126, the user service 125 retrieves learning progress information about the end user's learning progress that was tracked and maintained at the escrow user account 129, and can then populate the full user account 144 at the external learning platform 120 with learning progress information for that end user 102, as will be described below with reference to FIGS. 4-7. Prior to doing so, an example will be described with reference to FIG. 3 to illustrate what can happen in a scenario when no escrow user or full user has been provisioned at the external learning platform 120.

Figure 3:
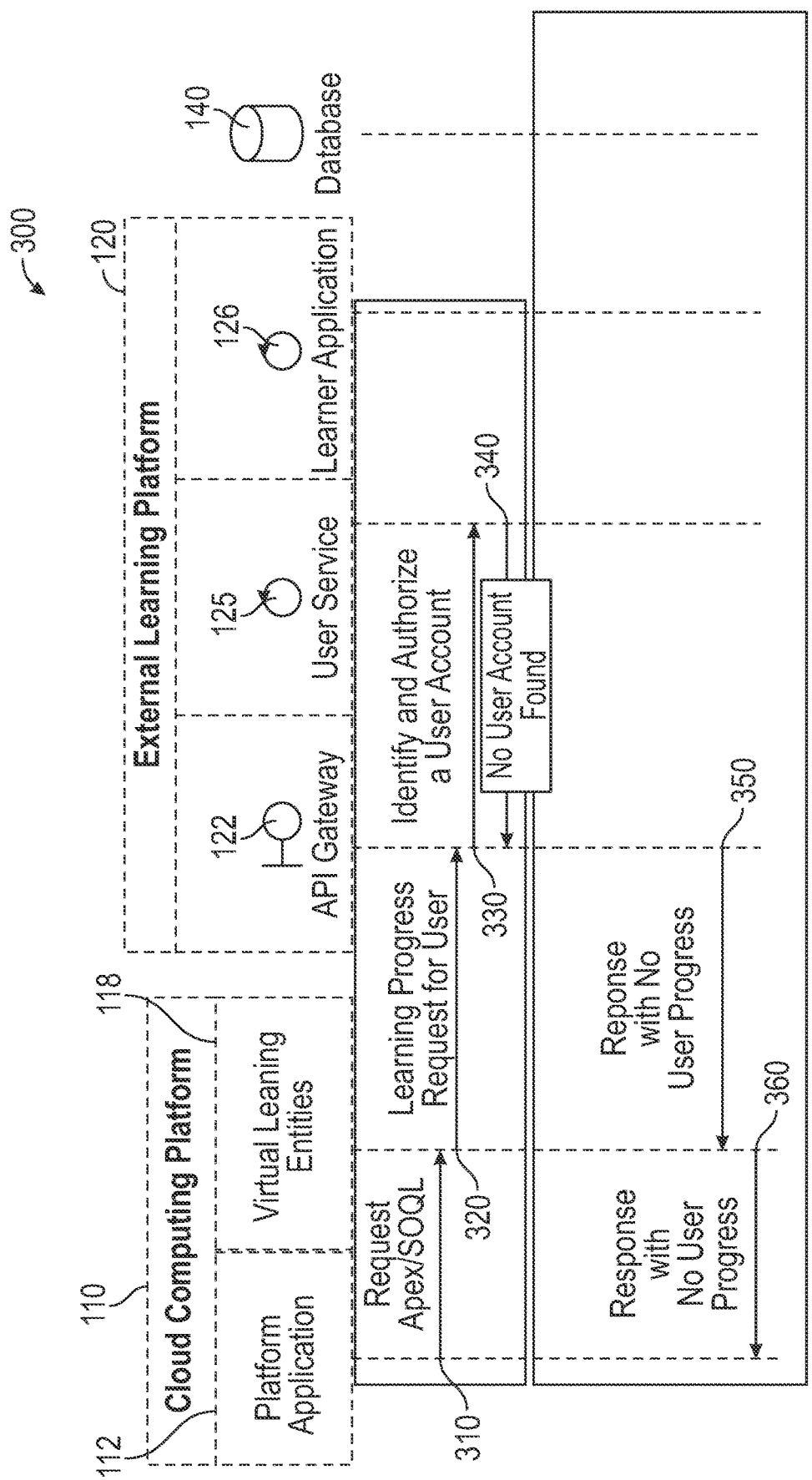
FIG. 3 is a flow diagram that illustrates a data flow in accordance with the disclosed embodiments.

API Call to Retrieve Learning Progress Prior to Creation of an Escrow User Account or Full User Account at the External Learning Platform FIG. 3 is a flow diagram that illustrates a data flow 300 in accordance with the disclosed embodiments. The data flow 300 happens when an end user 102 of the cloud computing platform 110 submits a read request to the external learning platform 120 to retrieve learning progress information associated with the end user 102 (e.g., when the end user 102 completes a quiz and submits the results).

For example, at 310, the end user 102 of the cloud computing platform 110 submits a request (e.g., APEX/SOQL) to retrieve learning progress information. At 320, the virtual learning entities 118 send the request to the API gateway 122 of the external learning platform 120. At 330, the API gateway 122 identifies the end user 102 and sends an authorization request to an authorization module (not shown) of the user service 125 to identify either an escrow user account 129 or a full user account 144 that corresponds to the end user 102. In this example, it is presumed that no escrow user account 129 or full user account 144 exists yet. As such, at 340, the user service 125 sends a response back to the API gateway 122 that indicates that no escrow user account 129 or full user account 144 exists. At 350, the API gateway 122 forwards the response (indicating that there has been no learning progress) to the virtual learning entities 118, and at 360, the virtual learning entities 118 send the response to the cloud computing platform 110, where the platform application 112 can render a page, via a user interface of the platform application 112, indicating that no record of learning progress with respect to the end user 102 exists at the external learning platform 120.

It would be desirable to provide a mechanism for avoiding this problem, and some non-limiting solutions will be described below with reference to FIGS. 4-7.

Provisioning of an Escrow User Account During an Active Web Session

Figure 4:
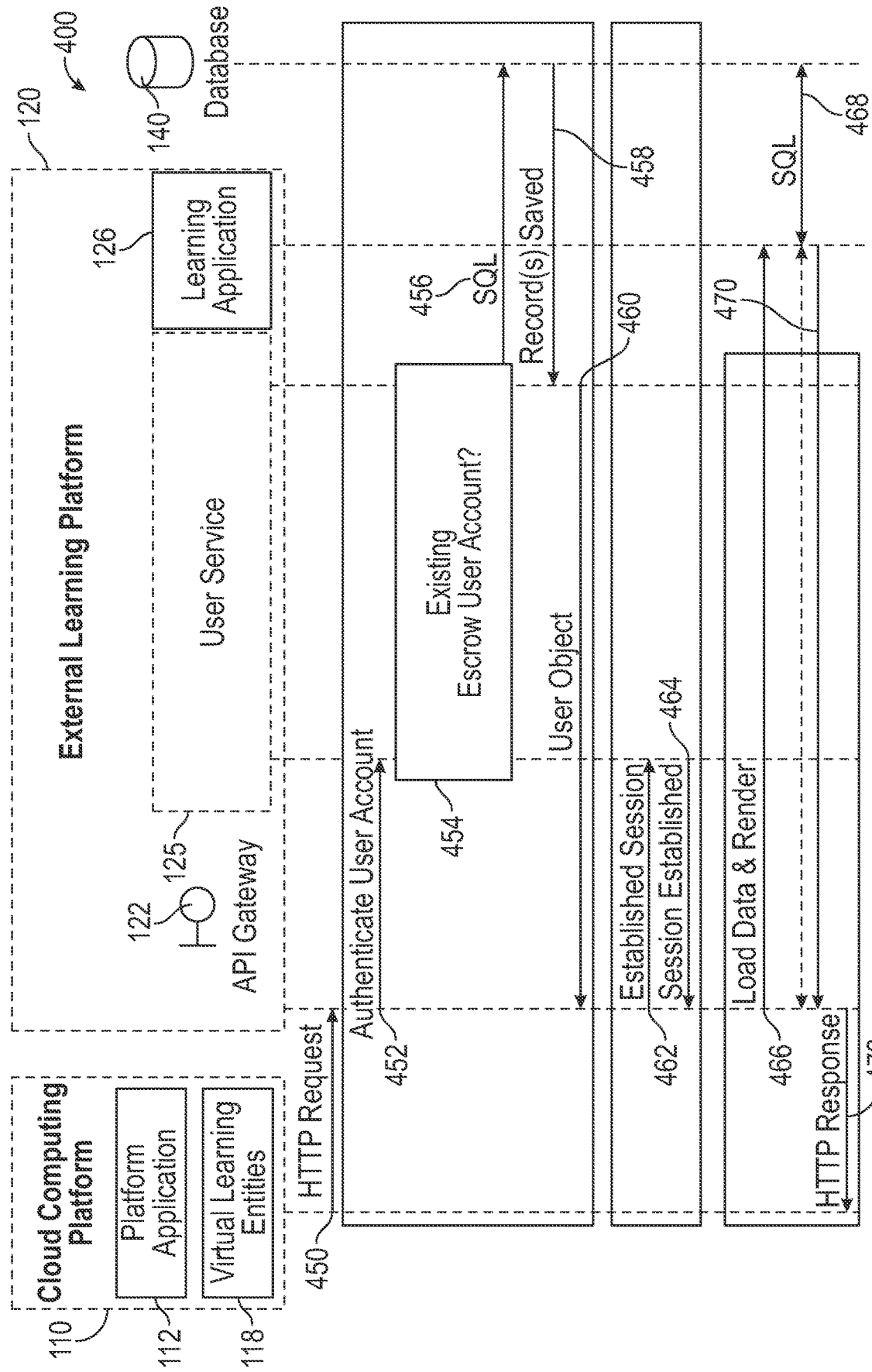
FIG. 4 is a flow diagram that illustrates a data flow in accordance with the disclosed embodiments.

FIG. 4 is a flow diagram that illustrates a data flow 400 in accordance with the disclosed embodiments. The data flow 400 illustrates a scenario where an end user 102 is interacting with learning content (e.g., taking a quiz) as part of an active web session. The data flow 400 begins at 450 when the end user 102 of the cloud computing platform 110 interacts with a user interface of the platform application (not shown) and causes an HTTP request (e.g., to submit quiz results) to be generated that gets sent to the API gateway 122 of the external learning platform 120.

At 452, the API gateway 122 sends an authentication request to the user service 125 to authenticate the end user 102. For example, in one embodiment, the authentication request includes an authentication/access token that includes user information for the end user 102. The user service 125 can perform token verification/validation to ensure that the authentication/access token was issued by an organization at the cloud computing platform 110 (e.g., that the authentication/access token corresponds to the end user). When authentication of the end user is successful, the flow 400 proceeds to 454. At 454, the user service 125 processes user information for the end user 102 (e.g., for example using the authorization module 124 of FIG. 1) and attempts to determine whether an escrow user account 129 corresponding to the end user 102 has been created. At 456, the user service 125 generates and sends the SQL query to the relational database management system (PostgreSQL) 140 to determine whether an escrow user account 129 has been created, and if not, to request that an escrow user account 129 be created (or provisioned) based on the user information. The SQL query can include any of the user information (or details) described above If a record for the escrow user account 129 is found at the relational database management system (PostgreSQL) 140, then the record is returned to the user service 125 at 458.

If no record for the escrow user account 129 is found at the relational database management system (PostgreSQL) 140, then the relational database management system 140 creates a record for the escrow user account 129, and the record is returned to the user service 125 at 458. In this case, the relational database management system (PostgreSQL) 140 can create an escrow user record for the escrow user account 129. The escrow user record uniquely/distinctly links or associates an identity for the user account in the cloud computing platform 110 with another unique identity for an escrow user account 129 at the external learning application 126 of the external learning platform 120. As such, the escrow user record links or associates the escrow user account 129 to another user account for the end user at the cloud computing platform 110.

At this point the escrow user account 129 has been created, and at 460, the user service 125 generates and sends a user object to the API gateway 122. In one embodiment, the user object includes the resolved record of the escrow user account 129 that allows the external learning platform 120 to associate (or resolve) learning progress information with respect to the user's interaction with learning content (e.g., because the external learning platform 120 knows whom to associate the learning progress information with).

Establishment of a Session

At any point after the escrow user account 129 has been created (or confirmed to have been previously created), at 462, the API gateway 122 generates a request to establish a session, which it sends to a session service component (not illustrated) of the user service 125. The session establishment request is processed, and a response is returned to the API gateway 122 to confirm that a session has been established at 464. From this point forward, the state of end user's interaction with the learning application 126 (including any learning progress information) will be captured by the escrow user account 129.

Subsequent Interaction with the External Learning Application

At 466, the API gateway 122 translates request(s) from the cloud computing platform 110, loads and renders data and sends it to the external learning application 126. Various intermediate communications can take place following 468 as represented by the dashed line arrow and arrows 468. At 468, the external learning application 126 can make any number of SQL queries to the database 140 and the database 140 can generate appropriate responses. At 470, the external learning application 126 generates a web page and sends the web page back to the API gateway 122. Eventually the data flow 400 proceeds to 472, where the API gateway 122 translates the web page and sends an API response back to the cloud computing platform so that web page can be displayed to the end user 102 of the cloud computing platform 110.

Figure 5:
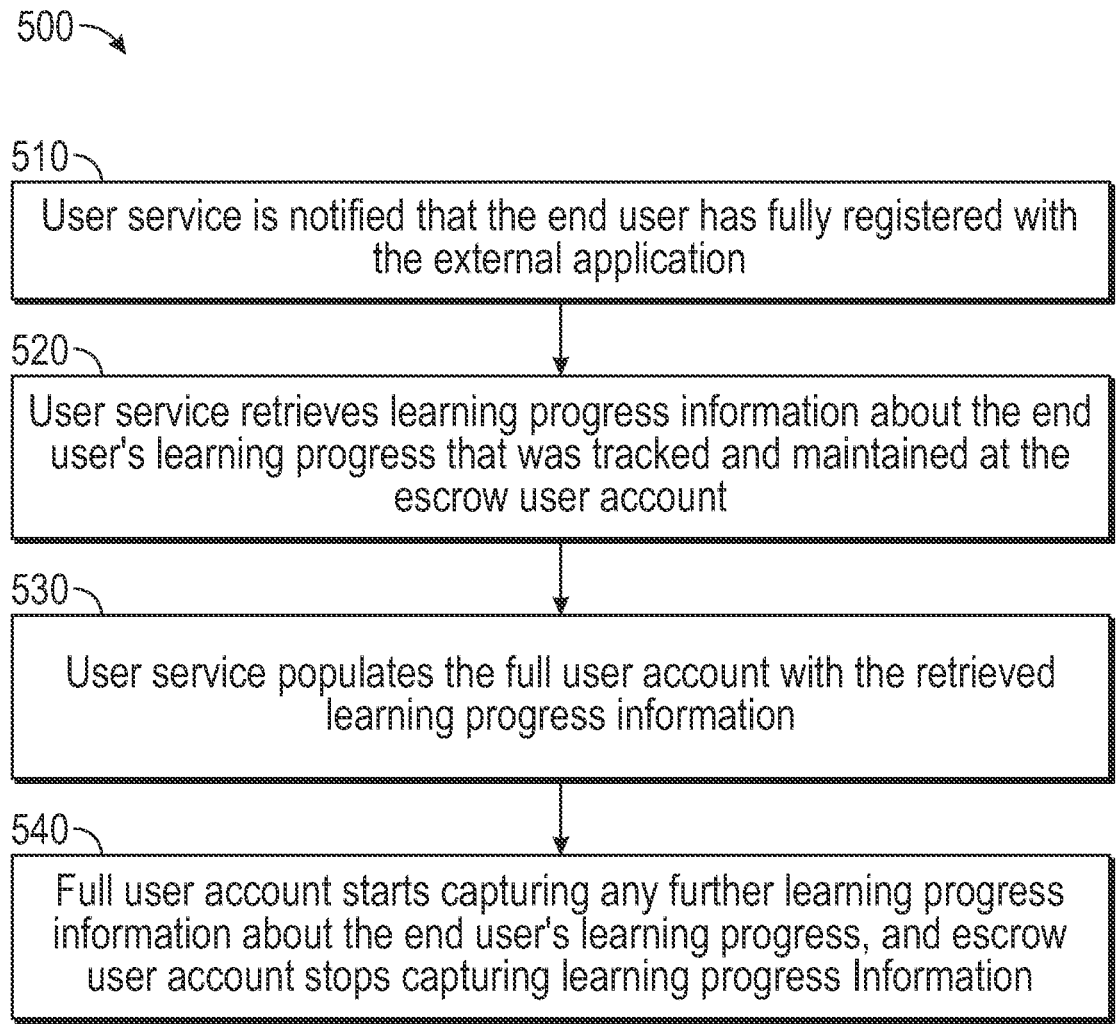
FIG. 5 is a flow chart that illustrates another method for tracking learning progress of an end user of a cloud computing platform after the end user registers a full user account at the external learning platform in accordance with the disclosed embodiments.

FIG. 5 is a flow chart that illustrates another method 500 for tracking learning progress of an end user 102 of a cloud computing platform 110 after the end user 102 registers a full user account 144 at the external learning platform 120 in accordance with the disclosed embodiments. Method 500 begins at 510, where the user service 125 receives a notification that the end user 102 has registered a full user account 144 with the external learning application 126 of the external learning platform 120. An example of the user registration process will be described below with reference to FIG. 6.

At 520, the user service 125, retrieves learning progress information about the end user's learning progress that has been tracked and maintained at the escrow user account 129. At 530, the user service 125 populates (or "hydrates") the full user account 144 with the learning progress information for the end user 102 that was retrieved from the escrow user account 129. After the end user 102 registers the full user account 144 at the external learning platform 120, at 540, the full user account 144 starts capturing any further learning progress information that is generated as the end user 102 interacts with virtual learning entities 118 of the cloud computing platform 110. At this point, the escrow user account 129 can stop capturing the learning progress information at this point since it will be captured by the full user account 144.

Full User Registration Flow

Figure 6:
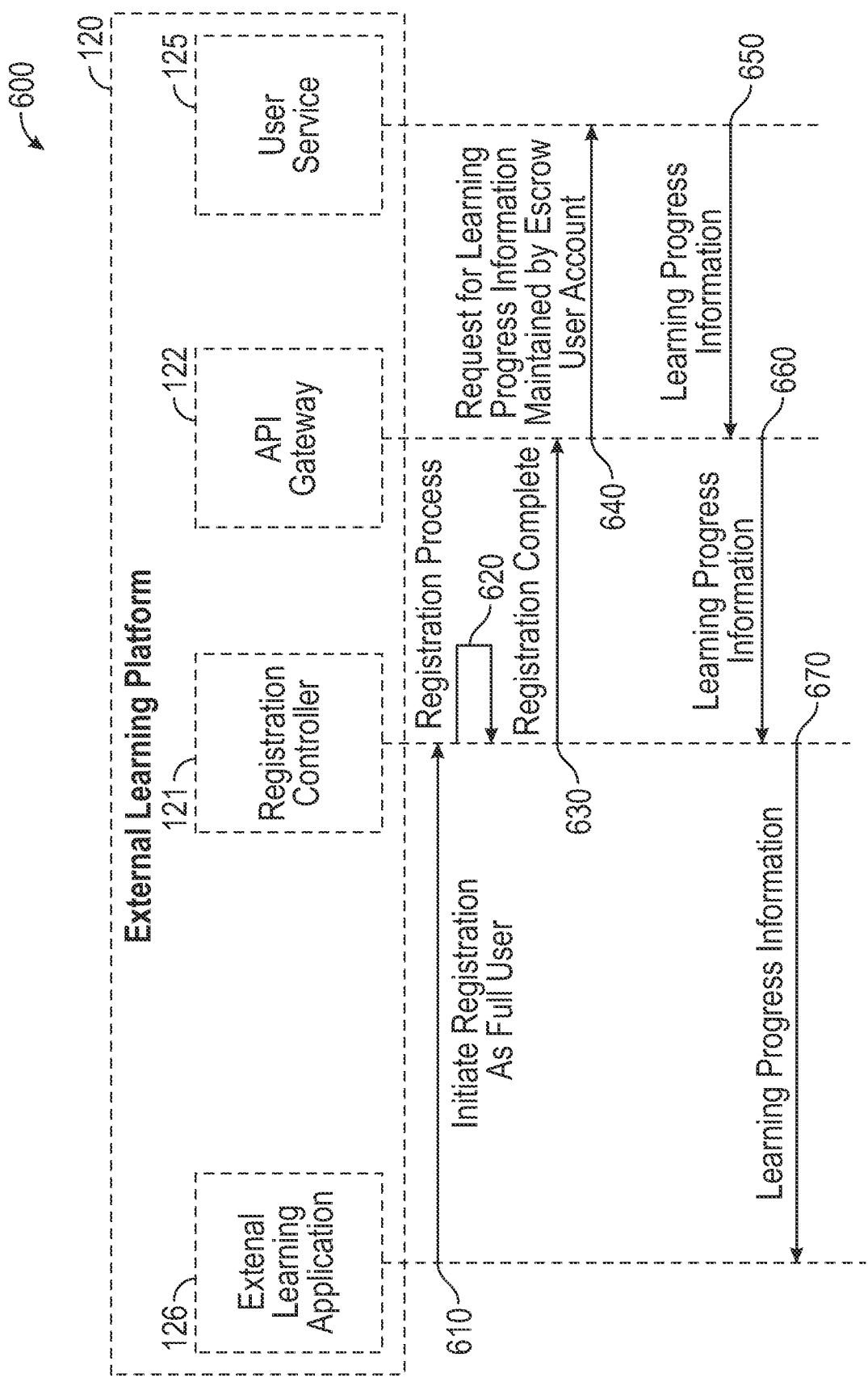
FIG. 6 is a flow diagram that illustrates a user registration flow in accordance with the disclosed embodiments.

FIG. 6 is a flow diagram that illustrates a user registration flow 600 in accordance with the disclosed embodiments. Although not illustrated in FIG. 6, prior to 610, an end user (not shown) of the cloud computing platform (not shown) can cause an HTTP request to be submitted to the external learning platform 120 to initiate registration with the external learning application 126 of the external learning platform 120.

At 610, the external learning application 126 sends a signup request to initiate a registration process to register the end user 102 as a full user, and at 620, a registration controller 121 performs signup processing to register a full user account 144 for the end user 102 at the external learning platform 120. As part of the signup processing, the registration controller 121 can generate an identity for the full user account 144 and map it to an identity for the end user 102 and/or the identity for the escrow user account 129. At 630, the registration controller 121 sends the API gateway 122 information indicating the user registration process is complete for the end user 102. This information can include the identity for the full user account 144, and a mapping of it to the identity for the end user 102 at the cloud computing platform 110 and/or the identity for the escrow user account 129.

At 640, the API gateway 122 communicates a request to the user service 125 for learning progress information that is maintained at the escrow user account 129 (not shown in FIG. 6) and at 650, the user service 125 returns learning progress information (that was maintained at the escrow user account 129) to the API gateway 122.

At 660, the API gateway 122 then communicates the learning progress information (that was maintained at the escrow user account 129) to the registration controller 121. The data flow 600 is then completed at 670, where the registration controller 121 sends information to the external learning platform 120 indicating that the end user 102 is fully registered and signed up with a full user account 144 with along with learning progress information of the end user 102 (e.g., information regarding existing learning badges and points). Although not illustrated in FIG. 6, the full user account 144 starts capturing any further learning progress information that is generated as the end user 102 interacts with virtual learning entities 118 of the cloud computing platform 110. The escrow user account 129 can stop capturing the learning progress information at this point since it will be captured by the full user account 144.

API Call to Retrieve Learning Progress of an Escrow User Account

Figure 7:
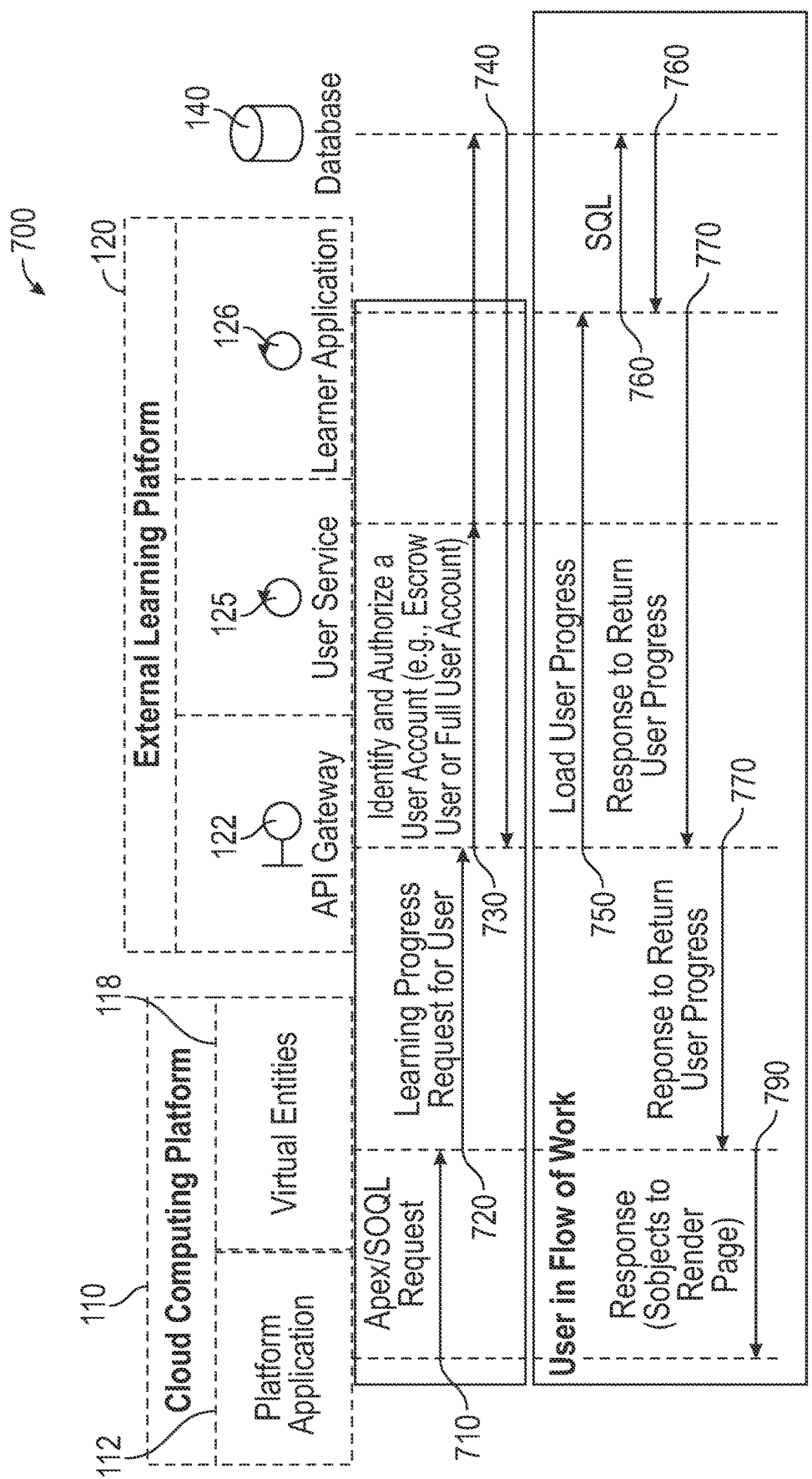
FIG. 7 is a flow diagram that illustrates a data flow in accordance with the disclosed embodiments.

FIG. 7 is a flow diagram that illustrates a data flow 700 in accordance with the disclosed embodiments. The data flow 700 happens when an end user 102 of the cloud computing platform 110 submits a request to the external learning platform 120 to retrieve learning progress information of the end user 102. For example, at 710, the end user 102 of the cloud computing platform 110 submits a request (e.g., APEX/SOQL) to retrieve learning progress information. At 720, the virtual learning entities 118 at the cloud computing platform 110 process the request to generate a request that is sent to the API gateway 122 of the external learning platform 120. The request includes an authentication/access token that includes user information identifying the end user's user account in the cloud computing platform 110.

At 730, the API gateway 122 sends an authentication request to an authorization module (not shown) of the user service 125 to authenticate the end user 102. For example, in one embodiment, the authentication request includes the authentication/access token that includes user information that identifies the end user 102. The user service 125 processes the authentication request and submits it to the database 140. For example, the user service 125 can perform token verification/validation to ensure that the authentication/access token was issued by an organization at the cloud computing platform 110 (e.g., that the authentication/access token corresponds to the end user). When authentication of the end user is successful, the user service 125 processes user information for the end user 102 (e.g., for example using the authorization module 124 of FIG. 1) and generates and sends the SQL query to the relational database management system (PostgreSQL) 140. The SQL query can include any of the user information (or details) described above. In this flow, it is presumed that an escrow user account 129 has already been created (and will be found at the relational database management system (PostgreSQL) 140). At 740, the database 140 sends the identified escrow user account to the learner application 126, which forwards it to the user service 125, which in turn forwards it to the API gateway 122. Having the identified escrow user account allows these entities to service the learning progress request (from 720) at steps 750-790.

At 750, the API gateway 122 can send a request to the external learning application 126 to read or load the learning progress from the escrow user account 129. At 760, the external learning application 126 processes the request, and sends an SQL query to the 140 to retrieve the escrow user account's learning progress, and the 140 generates a SQL response. At 770, the external learning application 126 can then generate and send a response to the API gateway 122 that includes the learning progress information from the escrow user account 129. At 780, the API gateway 122 forwards the response to the virtual learning entities 118, and at 790, the virtual learning entities 118 send the response to the cloud computing platform 110, where the platform application 112 can render a page with objects (e.g., SObjects) and display the learning progress to the end user 102 via a user interface of the platform application 112.

The following description is of one example of a system in which the features described above may be implemented. The components of the system described below are merely one example and should not be construed as limiting. The cloud computing platform 110 described above with respect to FIGS. 1-8 may be implemented in any other type of computing environment, such as one with multiple servers, one with a single server, a multi-tenant server environment, a single-tenant server environment, or some combination of the above. Non-limiting examples of a cloud computing platform 110 will now be described with reference to FIGS. 8-11.

Figure 8:
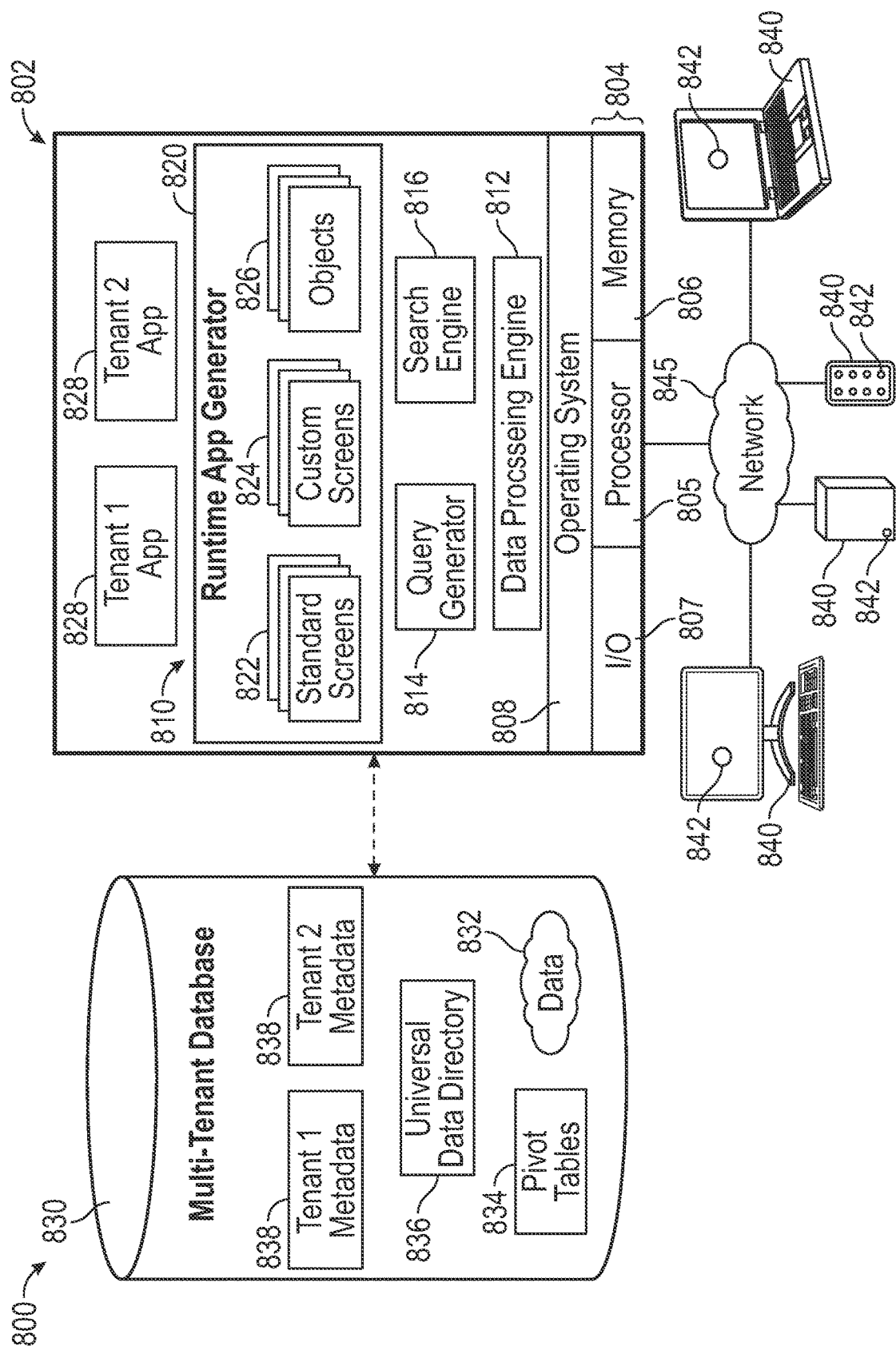
FIG. 8 is a schematic block diagram of an example of a multi-tenant computing environment in which features of the disclosed embodiments can be implemented in accordance with the disclosed embodiments.

FIG. 8 is a schematic block diagram of an example of a multi-tenant computing environment in which features of the disclosed embodiments can be implemented in accordance with the disclosed embodiments. As shown in FIG. 8, an exemplary cloud-based solution may be implemented in the context of a multi-tenant system 800 including a server 802 that supports applications 828 based upon data 832 from a database 830 that may be shared between multiple tenants, organizations, or enterprises, referred to herein as a multi-tenant database. Data and services generated by the various applications 828 are provided via a network 845 to any number of user systems 840, such as desktops, laptops, tablets, smartphones or other client devices, Google Glass™, and any other computing device implemented in an automobile, aircraft, television, or other business or consumer electronic device or system, including web clients.

Each application 828 is suitably generated at run-time (or on-demand) using a common application platform 810 that securely provides access to the data 832 in the database 830 for each of the various tenant organizations subscribing to the system 800. In accordance with one non-limiting example, the service cloud 800 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 830. In this regard, each tenant includes one or more users and/or groups associated with, authorized by, or otherwise belonging to that respective tenant. Stated another way, each respective user within the multi-tenant system 800 is associated with, assigned to, or otherwise belongs to a particular one of the plurality of enterprises supported by the system 800.

Each enterprise tenant may represent a company, corporate department, business or legal organization, and/or any other entities that maintain data for particular sets of users (such as their respective employees or customers) within the multi-tenant system 800. Although multiple tenants may share access to the server 802 and the database 830, the particular data and services provided from the server 802 to each tenant can be securely isolated from those provided to other tenants. The multi-tenant architecture therefore allows different sets of users to share functionality and hardware resources without necessarily sharing any of the data 832 belonging to or otherwise associated with other organizations.

The multi-tenant database 830 may be a repository or other data storage system capable of storing and managing the data 832 associated with any number of tenant organizations. The database 830 may be implemented using conventional database server hardware. In various embodiments, the database 830 shares processing hardware 804 with the server 802. In other embodiments, the database 830 is implemented using separate physical and/or virtual database server hardware that communicates with the server 802 to perform the various functions described herein.

In an exemplary embodiment, the database 830 includes a database management system or other equivalent software capable of determining an optimal query plan for retrieving and providing a particular subset of the data 832 to an instance of application (or virtual application) 828 in response to a query initiated or otherwise provided by an application 828, as described in greater detail below. The multi-tenant database 830 may alternatively be referred to herein as an on-demand database, in that the database 830 provides (or is available to provide) data at run-time to on-demand virtual applications 828 generated by the application platform 810, as described in greater detail below.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants.

Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 may be implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like.

The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or platform, e.g., a portable hard drive, a USB flash drive, an optical disc, or the like.

The application platform 810 is any sort of software application or other data processing engine that generates the virtual applications 828 that provide data and/or services to the user systems 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the user systems 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the user systems 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its user system 840, as appropriate.

The runtime application generator 820 suitably interacts with the query generator 814 to efficiently obtain multi-tenant data 832 from the database 830 as needed in response to input queries initiated or otherwise provided by users of the user systems 840. In a typical embodiment, the query generator 814 considers the identity of the user requesting a particular function (along with the user's associated tenant), and then builds and executes queries to the database 830 using system-wide metadata from the UDD 836, tenant specific metadata 838, pivot tables 834, and/or any other available resources. The query generator 814 in this example therefore maintains security of the common database 830 by ensuring that queries are consistent with access privileges granted to the user and/or tenant that initiated the request.

With continued reference to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled user system 840 on the network 845. In an exemplary embodiment, the user system 840 includes a display device, such as a monitor, screen, or another conventional electronic display capable of graphically presenting data and/or information retrieved from the multi-tenant database 830, as described in greater detail below.

Typically, the user operates a conventional browser application or other client program 842 executed by the user system 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. However, if a user chooses to manually upload an updated file (through either the web-based user interface or through an API), it will also be shared automatically with all of the users/devices that are designated for sharing.

As noted above, the virtual application 828 may contain Java, ActiveX, or other content that can be presented using conventional client software running on the user system 840; other embodiments may simply provide dynamic web or other content that can be presented and viewed by the user, as desired. As described in greater detail below, the query generator 814 suitably obtains the requested subsets of data 832 from the database 830 as needed to populate the tables, reports or other features of the particular virtual application 828. In various embodiments, application 828 embodies the functionality of a collaboration solution such as the Chatter system, described below.

Figure 9:
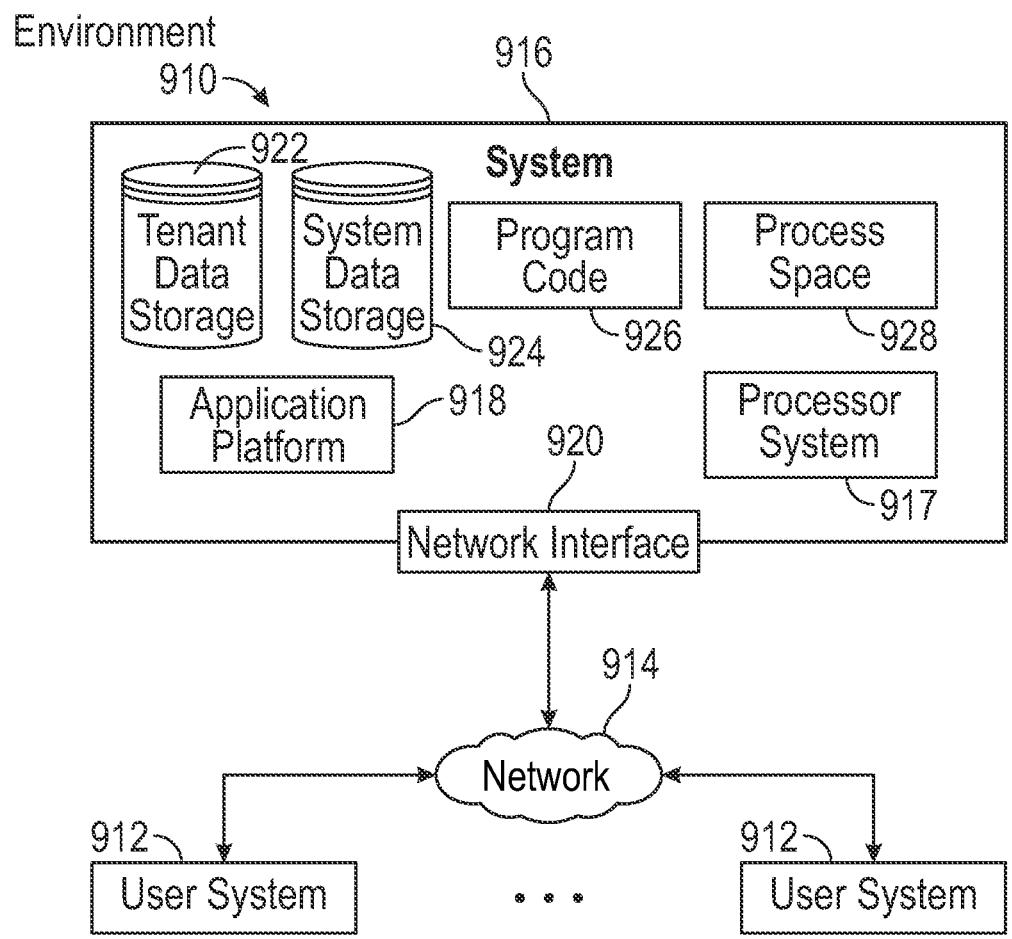
FIG. 9 shows a block diagram of an example of an environment in which an on-demand database service can be used in accordance with some implementations.

FIG. 9 shows a block diagram of an example of an environment 910 in which an on-demand database service can be used in accordance with some implementations. The environment 910 includes user systems 912, a network 914, a database system 916 (also referred to herein as a "cloud-based system"), a processor system 917, an application platform 918, a network interface 920, tenant database 922 for storing tenant data 923, system database 924 for storing system data 925, program code 926 for implementing various functions of the system 916, and process space 928 for executing database system processes and tenant-specific processes, such as running applications as part of an application hosting service. In some other implementations, environment 910 may not have all of these components or systems, or may have other components or systems instead of, or in addition to, those listed above.

In some implementations, the environment 910 is an environment in which an on-demand database service exists. An on-demand database service, such as that which can be implemented using the system 916, is a service that is made available to users outside of the enterprise(s) that own, maintain or provide access to the system 916. As described above, such users generally do not need to be concerned with building or maintaining the system 916. Instead, resources provided by the system 916 may be available for such users' use when the users need services provided by the system 916; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 918 can be a framework that allows the applications of system 916 to execute, such as the hardware or software infrastructure of the system 916. In some implementations, the application platform 918 enables the creation, management and execution of one or more applications developed by the provider of the on-demand database service, users accessing the on-demand database service via user systems 912, or third party application developers accessing the on-demand database service via user systems 912.

In some implementations, the system 916 implements a web-based customer relationship management (CRM) system. For example, in some such implementations, the system 916 includes application servers configured to implement and execute CRM software applications as well as provide related data, code, forms, renderable web pages and documents and other information to and from user systems 912 and to store to, and retrieve from, a database system related data, objects, and Web page content. In some MTS implementations, data for multiple tenants may be stored in the same physical database object in tenant database 922. In some such implementations, tenant data is arranged in the storage medium(s) of tenant database 922 so that data of one tenant is kept logically separate from that of other tenants so that one tenant does not have access to another tenant's data, unless such data is expressly shared. The system 916 also implements applications other than, or in addition to, a CRM application. For example, the system 916 can provide tenant access to multiple hosted (standard and custom) applications, including a CRM application. User (or third party developer) applications, which may or may not include CRM, may be supported by the application platform 918. The application platform 918 manages the creation and storage of the applications into one or more database objects and the execution of the applications in one or more virtual machines in the process space of the system 916.

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 914 can be or include any network or combination of networks of systems or devices that communicate with one another. For example, the network 914 can be or include any one or any combination of a LAN (local area network), WAN (wide area network), telephone network, wireless network, cellular network, point-to-point network, star network, token ring network, hub network, or other appropriate configuration. The network 914 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 912 can communicate with system 916 using TCP/IP and, at a higher network level, other common Internet protocols to communicate, such as HTTP, FTP, AFS, WAP, etc. In an example where HTTP is used, each user system 912 can include an HTTP client commonly referred to as a "web browser" or simply a "browser" for sending and receiving HTTP signals to and from an HTTP server of the system 916. Such an HTTP server can be implemented as the sole network interface 920 between the system 916 and the network 914, but other techniques can be used in addition to or instead of these techniques. In some implementations, the network interface 920 between the system 916 and the network 914 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 912 can be implemented as any computing device(s) or other data processing apparatus or systems usable by users to access the database system 916. For example, any of user systems 912 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 912 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 916) of the user system 912 to access, process and view information, pages and applications available to it from the system 916 over the network 914.

Each user system 912 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 912 in conjunction with pages, forms, applications and other information provided by the system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 912 may differ in their respective capacities, and the capacity of a particular user system 912 can be entirely determined by permissions (permission levels) for the current user of such user system. For example, where a salesperson is using a particular user system 912 to interact with the system 916, that user system can have the capacities allotted to the salesperson. However, while an administrator is using that user system 912 to interact with the system 916, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 912 and some or all of its components are operator-configurable using applications, such as a browser, including computer code executed using a central processing unit (CPU) such as an Intel Pentium® processor or the like. Similarly, the system 916 (and additional instances of an MTS, where more than one is present) and all of its components can be operator-configurable using application(s) including computer code to run using the processor system 917, which may be implemented to include a CPU, which may include an Intel Pentium® processor or the like, or multiple CPUs.

The system 916 includes tangible computer-readable media having non-transitory instructions stored thereon/in that are executable by or used to program a server or other computing system (or collection of such servers or computing systems) to perform some of the implementation of processes described herein. For example, computer program code 926 can implement instructions for operating and configuring the system 916 to intercommunicate and to process web pages, applications and other data and media content as described herein. In some implementations, the computer code 926 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 10:
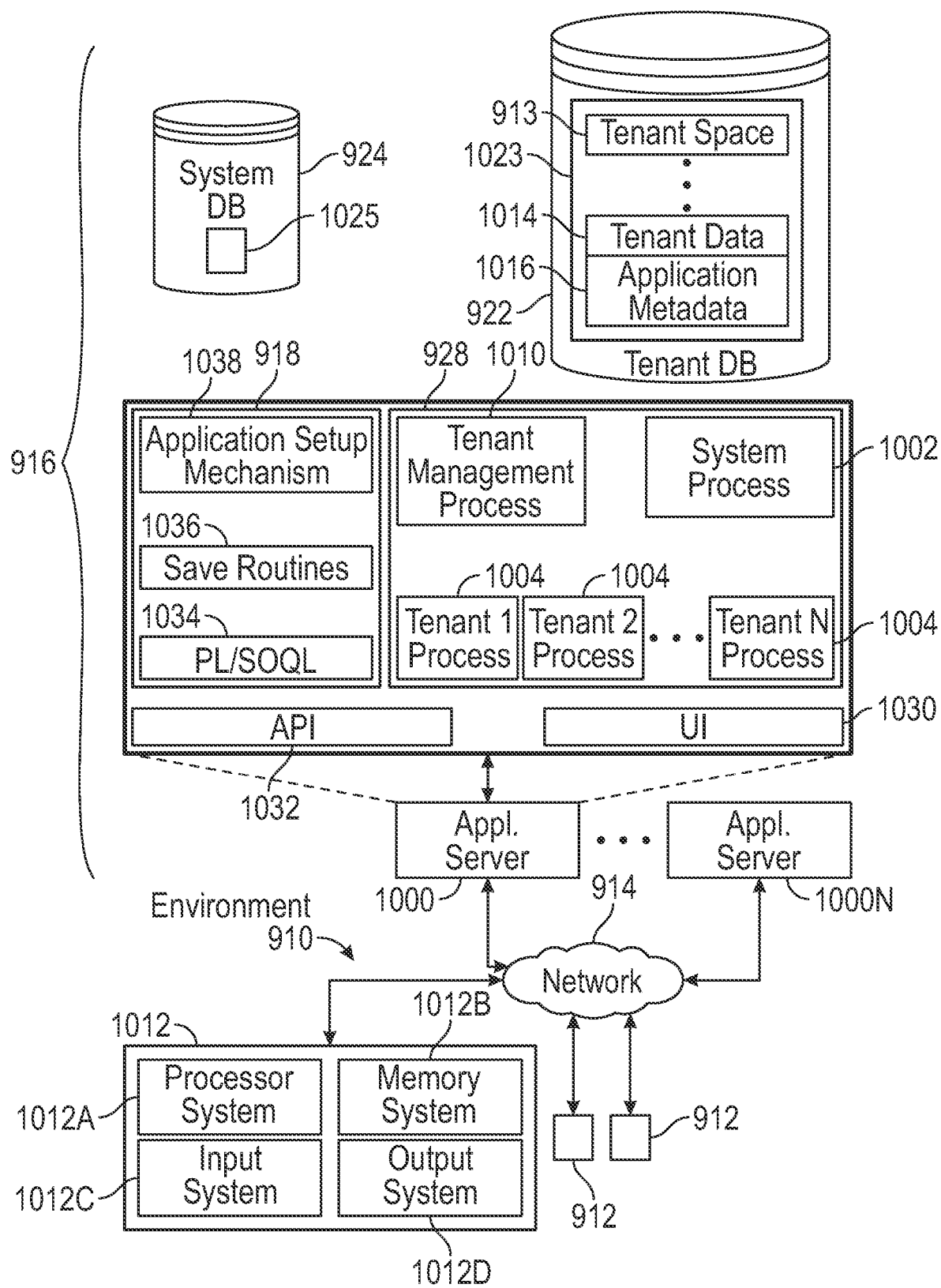
FIG. 10 shows a block diagram of example implementations of elements of FIG. 9 and example interconnections between these elements according to some implementations.

FIG. 10 shows a block diagram of example implementations of elements of FIG. 9 and example interconnections between these elements according to some implementations. That is, FIG. 10 also illustrates environment 910, but FIG. 10, various elements of the system 916 and various interconnections between such elements are shown with more specificity according to some more specific implementations. Elements from FIG. 9 that are also shown in FIG. 10 will use the same reference numbers in FIG. 10 as were used in FIG. 9. Additionally, in FIG. 10, the user system 912 includes a processor system 1012A, a memory system 1012B, an input system 1012C, and an output system 1012D. The processor system 1012A can include any suitable combination of one or more processors. The memory system 1012B can include any suitable combination of one or more memory devices. The input system 1012C can include any suitable combination of input devices, such as one or more touchscreen interfaces, keyboards, mice, trackballs, scanners, cameras, or interfaces to networks. The output system 1012D can include any suitable combination of output devices, such as one or more display devices, printers, or interfaces to networks.

In FIG. 10, the network interface 920 of FIG. 9 is implemented as a set of HTTP application servers $1000_1$-$1000_N$. Each application server 1000, also referred to herein as an "app server," is configured to communicate with tenant database 922 and the tenant data 1023 therein, as well as system database 924 and the system data 1025 therein, to serve requests received from the user systems 1012. The tenant data 1023 can be divided into individual tenant storage spaces 1013, which can be physically or logically arranged or divided. Within each tenant storage space 1013, tenant data 1014 and application metadata 1016 can similarly be allocated for each user. For example, a copy of a user's most recently used (MRU) items can be stored to user storage 1014. Similarly, a copy of MRU items for an entire organization that is a tenant can be stored to tenant storage space 1013.

The process space 928 includes system process space 1002, individual tenant process spaces 1004 and a tenant management process space 1010. The application platform 918 includes an application setup mechanism 1038 that supports application developers' creation and management of applications. Such applications and others can be saved as metadata into tenant database 922 by save routines 1036 for execution by subscribers as one or more tenant process spaces 1004 managed by tenant management process 1010, for example. Invocations to such applications can be coded using PL/SOQL 1034, which provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 916 of FIG. 10 also includes a user interface (UI) 1030 and an application programming interface (API) 1032 to system 916 resident processes to users or developers at user systems 1012. In some other implementations, the environment 910 may not have the same elements as those listed above or may have other elements instead of, or in addition to, those listed above.

Each application server 1000 can be communicably coupled with tenant database 922 and system database 924, for example, having access to tenant data 1023 and system data 1025, respectively, via a different network connection. For example, one application server $1000_1$ can be coupled via the network 914 (for example, the Internet), another application server $1000_N$ can be coupled via a direct network link, and another application server (not illustrated) can be coupled by yet a different network connection. Transfer Control Protocol and Internet Protocol (TCP/IP) are examples of typical protocols that can be used for communicating between application servers 1000 and the system 916. However, it will be apparent to one skilled in the art that other transport protocols can be used to optimize the system 916 depending on the network interconnections used.

In some implementations, each application server 1000 is configured to handle requests for any user associated with any organization that is a tenant of the system 916. Because it can be desirable to be able to add and remove application servers 1000 from the server pool at any time and for various reasons, in some implementations there is no server affinity for a user or organization to a specific application server 1000. In some such implementations, an interface system implementing a load balancing function (for example, an F5 Big-IP load balancer) is communicably coupled between the application servers 1000 and the user systems 1012 to distribute requests to the application servers 1000. In one implementation, the load balancer uses a least-connections algorithm to route user requests to the application servers 1000. Other examples of load balancing algorithms, such as round robin and observed-response-time, also can be used. For example, in some instances, three consecutive requests from the same user could hit three different application servers 1000, and three requests from different users could hit the same application server 1000. In this manner, by way of example, system 916 can be a multi-tenant system in which system 916 handles storage of, and access to, different objects, data and applications across disparate users and organizations.

In one example storage use case, one tenant can be a company that employs a sales force where each salesperson uses system 916 to manage aspects of their sales. A user can maintain contact data, leads data, customer follow-up data, performance data, goals and progress data, etc., all applicable to that user's personal sales process (for example, in tenant database 922). In an example of a MTS arrangement, because all of the data and the applications to access, view, modify, report, transmit, calculate, etc., can be maintained and accessed by a user system 1012 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 916 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 916 also can maintain system level data usable by multiple tenants or other data. Such system level data can include industry reports, news, postings, and the like that are sharable among tenants.

In some implementations, the user systems 1012 (which also can be client systems) communicate with the application servers 1000 to request and update system-level and tenant-level data from the system 916. Such requests and updates can involve sending one or more queries to tenant database 922 or system database 924. The system 916 (for example, an application server 1000 in the system 916) can automatically generate one or more SQL statements (for example, one or more SQL queries) designed to access the desired information. System database 924 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11A:
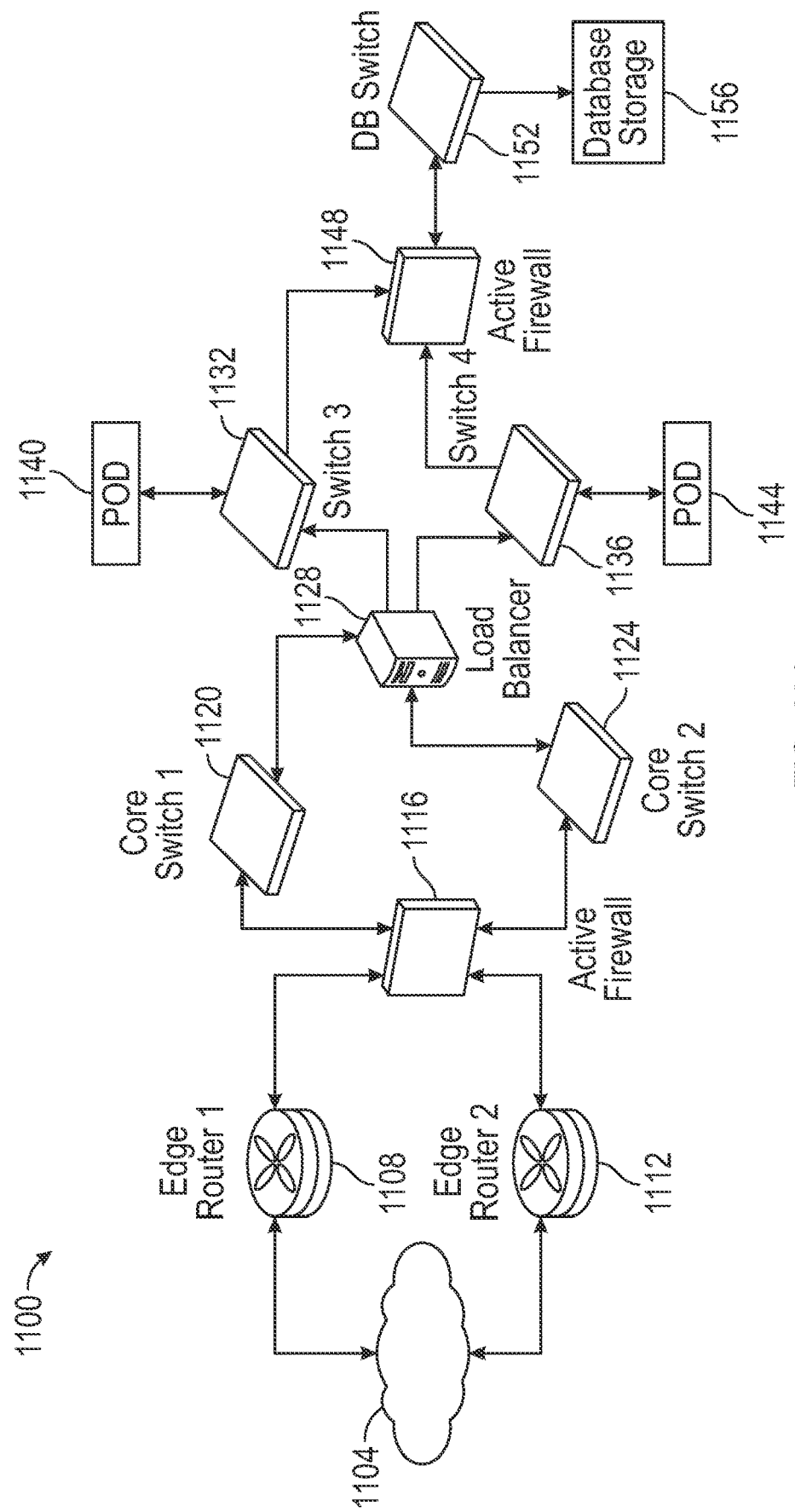
FIG. 11A shows a system diagram illustrating example architectural components of an on-demand database service environment according to some implementations.

FIG. 11A shows a system diagram illustrating example architectural components of an on-demand database service environment 1100 according to some implementations. A client machine communicably connected with the cloud 1104, generally referring to one or more networks in combination, as described herein, can communicate with the on-demand database service environment 1100 via one or more edge routers 1108 and 1112. A client machine can be any of the examples of user systems 12 described above. The edge routers can communicate with one or more core switches 1120 and 1124 through a firewall 1116. The core switches can communicate with a load balancer 1128, which can distribute server load over different pods, such as the pods 1140 and 1144. The pods 1140 and 1144, which can each include one or more servers or other computing resources, can perform data processing and other operations used to provide on-demand services. Communication with the pods can be conducted via pod switches 1132 and 1136. Components of the on-demand database service environment can communicate with database storage 1156 through a database firewall 1148 and a database switch 1152.

Figure 11B:
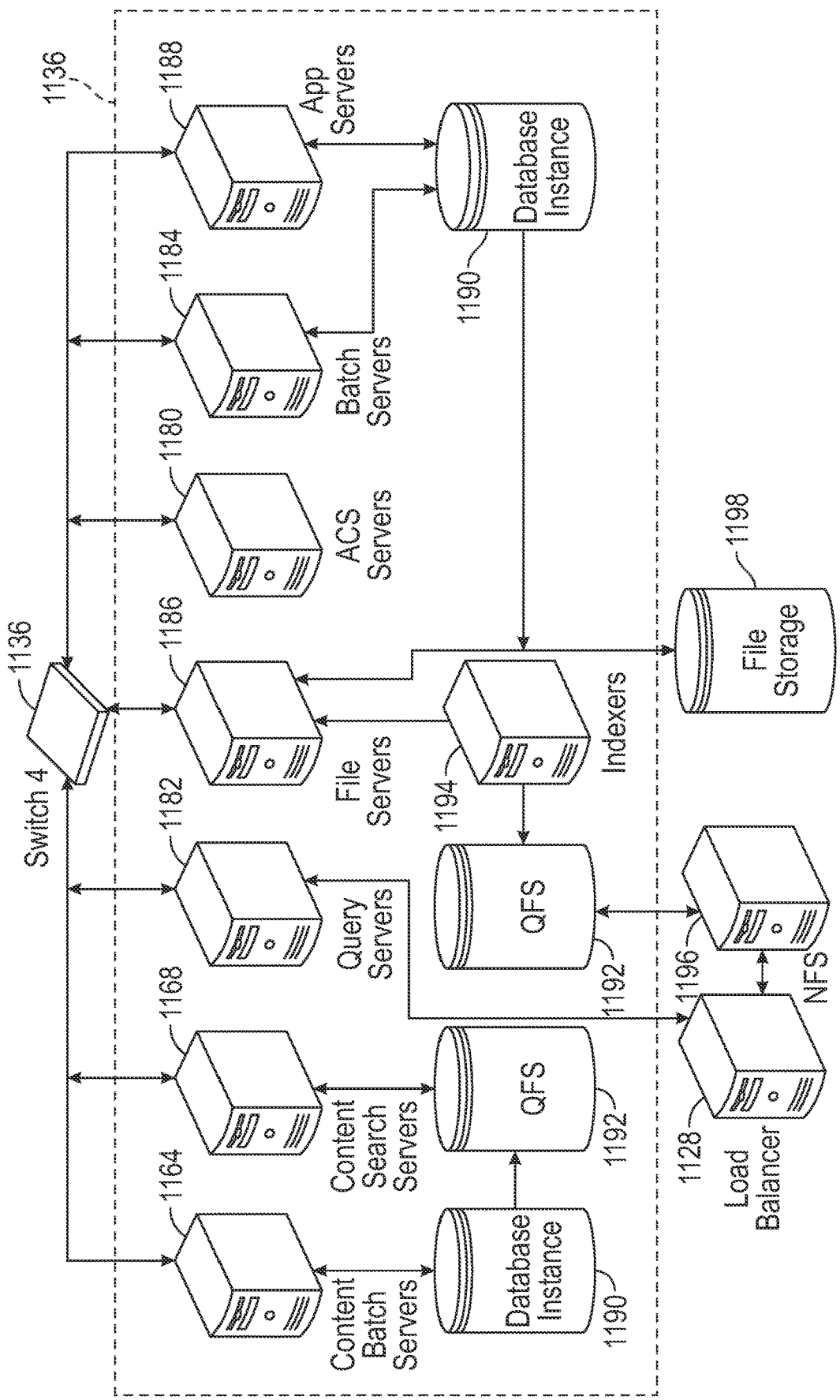
FIG. 11B shows a system diagram further illustrating example architectural components of an on-demand database service environment according to some implementations.

As shown in FIGS. 11A and 11B, accessing an on-demand database service environment can involve communications transmitted among a variety of different hardware or software components. Further, the on-demand database service environment 1100 is a simplified representation of an actual on-demand database service environment. For example, while only one or two devices of each type are shown in FIGS. 11A and 11B, some implementations of an on-demand database service environment can include anywhere from one to several devices of each type. Also, the on-demand database service environment need not include each device shown in FIGS. 11A and 11B, or can include additional devices not shown in FIGS. 11A and 11B.

Additionally, it should be appreciated that one or more of the devices in the on-demand database service environment 1100 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1104 is intended to refer to a data network or multiple data networks, often including the Internet. Client machines communicably connected with the cloud 1104 can communicate with other components of the on-demand database service environment 1100 to access services provided by the on-demand database service environment. For example, client machines can access the on-demand database service environment to retrieve, store, edit, or process information. In some implementations, the edge routers 1108 and 1112 route packets between the cloud 1104 and other components of the on-demand database service environment 1100. For example, the edge routers 1108 and 1112 can employ the Border Gateway Protocol (BGP). The BGP is the core routing protocol of the Internet. The edge routers 1108 and 1112 can maintain a table of IP networks or 'prefixes', which designate network reachability among autonomous systems on the Internet.

In some implementations, the firewall 1116 can protect the inner components of the on-demand database service environment 1100 from Internet traffic. The firewall 1116 can block, permit, or deny access to the inner components of the on-demand database service environment 1100 based upon a set of rules and other criteria. The firewall 1116 can act as one or more of a packet filter, an application gateway, a stateful filter, a proxy server, or any other type of firewall.

In some implementations, the core switches 1120 and 1124 are high-capacity switches that transfer packets within the on-demand database service environment 1100. The core switches 1120 and 1124 can be configured as network bridges that quickly route data between different components within the on-demand database service environment. In some implementations, the use of two or more core switches 1120 and 1124 can provide redundancy or reduced latency.

In some implementations, the pods 1140 and 1144 perform the core data processing and service functions provided by the on-demand database service environment. Each pod can include various types of hardware or software computing resources. An example of the pod architecture is discussed in greater detail with reference to FIG. 11 DDDD. In some implementations, communication between the pods 1140 and 1144 is conducted via the pod switches 1132 and 1136. The pod switches 1132 and 1136 can facilitate communication between the pods 1140 and 1144 and client machines communicably connected with the cloud 1104, for example via core switches 1120 and 1124. Also, the pod switches 1132 and 1136 may facilitate communication between the pods 1140 and 1144 and the database storage 1156. In some implementations, the load balancer 1128 can distribute workload between the pods 1140 and 1144. Balancing the on-demand service requests between the pods can assist in improving the use of resources, increasing throughput, reducing response times, or reducing overhead. The load balancer 1128 may include multilayer switches to analyze and forward traffic.

In some implementations, access to the database storage 1156 is guarded by a database firewall 1148. The database firewall 1148 can act as a computer application firewall operating at the database application layer of a protocol stack. The database firewall 1148 can protect the database storage 1156 from application attacks such as structure query language (SQL) injection, database rootkits, and unauthorized information disclosure. In some implementations, the database firewall 1148 includes a host using one or more forms of reverse proxy services to proxy traffic before passing it to a gateway router. The database firewall 1148 can inspect the contents of database traffic and block certain content or database requests. The database firewall 1148 can work on the SQL application level atop the TCP/IP stack, managing applications' connection to the database or SQL management interfaces as well as intercepting and enforcing packets traveling to or from a database network or application interface.

In some implementations, communication with the database storage 1156 is conducted via the database switch 1152. The multi-tenant database storage 1156 can include more than one hardware or software components for handling database queries. Accordingly, the database switch 1152 can direct database queries transmitted by other components of the on-demand database service environment (for example, the pods 1140 and 1144) to the correct components within the database storage 1156. In some implementations, the database storage 1156 is an on-demand database system shared by many different organizations as described above with reference to FIG. 1, FIG. 9 and FIG. 10.

FIG. 11B shows a system diagram further illustrating example architectural components of an on-demand database service environment according to some implementations. The pod 1144 can be used to render services to a user of the on-demand database service environment 1100. In some implementations, each pod includes a variety of servers or other systems. The pod 1144 includes one or more content batch servers 1164, content search servers 1168, query servers 1182, file force servers 1186, access control system (ACS) servers 1180, batch servers 1184, and app servers 1188. The pod 1144 also can include database instances 1190, quick file systems (QFS) 1192, and indexers 1194. In some implementations, some or all communication between the servers in the pod 1144 can be transmitted via the switch 1136.

In some implementations, the app servers 1188 include a hardware or software framework dedicated to the execution of procedures (for example, programs, routines, scripts) for supporting the construction of applications provided by the on-demand database service environment 1100 via the pod 1144. In some implementations, the hardware or software framework of an app server 1188 is configured to execute operations of the services described herein, including performance of the blocks of various methods or processes described herein. In some alternative implementations, two or more app servers 1188 can be included and cooperate to perform such methods, or one or more other servers described herein can be configured to perform the disclosed methods.

The content batch servers 1164 can handle requests internal to the pod. Some such requests can be long-running or not tied to a particular customer. For example, the content batch servers 1164 can handle requests related to log mining, cleanup work, and maintenance tasks. The content search servers 1168 can provide query and indexer functions. For example, the functions provided by the content search servers 1168 can allow users to search through content stored in the on-demand database service environment. The file force servers 1186 can manage requests for information stored in the File force storage 1198. The File force storage 1198 can store information such as documents, images, and basic large objects (BLOBs). By managing requests for information using the file force servers 1186, the image footprint on the database can be reduced. The query servers 1182 can be used to retrieve information from one or more file storage systems. For example, the query system 1182 can receive requests for information from the app servers 1188 and transmit information queries to the NFS 1196 located outside the pod.

The pod 1144 can share a database instance 1190 configured as a multi-tenant environment in which different organizations share access to the same database. Additionally, services rendered by the pod 1144 may call upon various hardware or software resources. In some implementations, the ACS servers 1180 control access to data, hardware resources, or software resources. In some implementations, the batch servers 1184 process batch jobs, which are used to run tasks at specified times. For example, the batch servers 1184 can transmit instructions to other servers, such as the app servers 1188, to trigger the batch jobs.

In some implementations, the QFS 1192 is an open source file storage system available from Sun Microsystems® of Santa Clara, California. The QFS can serve as a rapid-access file storage system for storing and accessing information available within the pod 1144. The QFS 1192 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1168 or indexers 1194 to identify, retrieve, move, or update data stored in the network file storage systems 1196 or other storage systems.

In some implementations, one or more query servers 1182 communicate with the NFS 1196 to retrieve or update information stored outside of the pod 1144. The NFS 1196 can allow servers located in the pod 1144 to access information to access files over a network in a manner similar to how local storage is accessed. In some implementations, queries from the query servers 1182 are transmitted to the NFS 1196 via the load balancer 1128, which can distribute resource requests over various resources available in the on-demand database service environment. The NFS 1196 also can communicate with the QFS 1192 to update the information stored on the NFS 1196 or to provide information to the QFS 1192 for use by servers located within the pod 1144.

In some implementations, the pod includes one or more database instances 1190. The database instance 1190 can transmit information to the QFS 1192. When information is transmitted to the QFS, it can be available for use by servers within the pod 1144 without using an additional database call. In some implementations, database information is transmitted to the indexer 1194. Indexer 1194 can provide an index of information available in the database 1190 or QFS 1192. The index information can be provided to file force servers 1186 or the QFS 1192.

Figure 12:
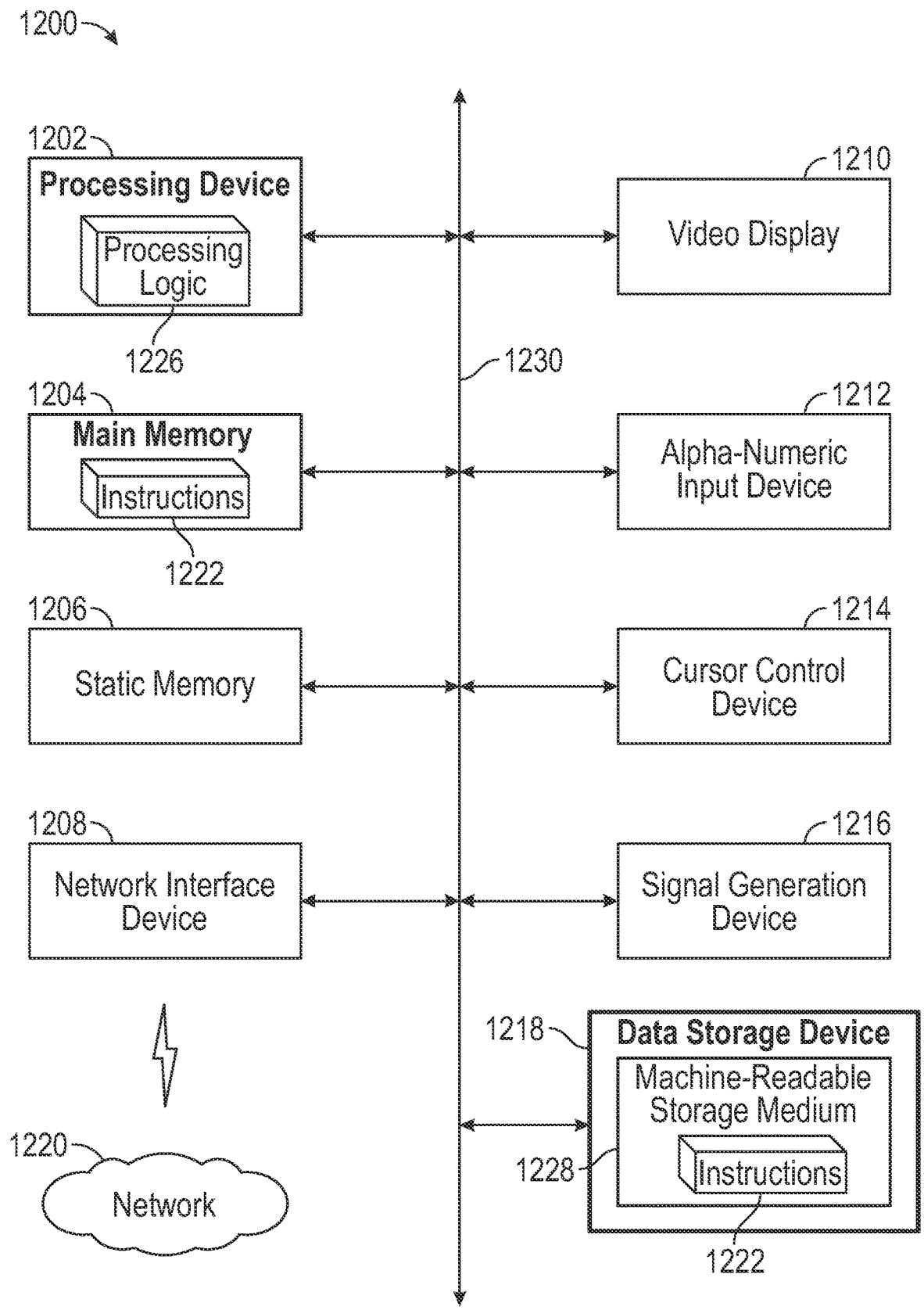
FIG. 12 is a block diagram that illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 any of the blocks, components or entities shown in FIGS. 1-3, 5, 7 and 9-11B.

The exemplary computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes (e.g., a special-purpose computer), or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose or special-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for tracking learning progress of an end user of a cloud computing platform when the end user is not registered with an external learning platform that provides an external learning application without requiring the end user to register with the external learning application, the method comprising:

generating learning progress information in response to user interaction with virtual learning entities provided at the cloud computing platform in the context of an application provided by the cloud computing platform while in an active web session, wherein the virtual learning entities represent content of the external learning application provided by the external learning platform, and wherein the external learning platform is external to the cloud computing platform;

receiving, at a user service of the external learning platform, a request to persist the learning progress information for the end user communicated from the cloud computing platform over a network when the user interaction in the context of the application generates the learning progress information; and when the user service receives the request:
  determining, at the user service, that a corresponding user account does not exist at the external learning platform that corresponds to the end user;
  automatically provisioning, at the external learning platform, an escrow user account that is associated with an identity for the end user in the cloud computing platform; and
  persisting, at the escrow user account at the external learning platform, the learning progress information of the end user; and
populating a full user account at the external learning platform with the learning progress information of the end user retrieved from the escrow user account when the end user registers the full user account with the external learning application.

2. The method according to claim 1, further comprising:
after the escrow user account is automatically provisioned:
establishing, via an API gateway of the external learning platform, a session with the user service; and
when there is a need to persist further learning progress information of the end user as the end user interacts with the virtual learning entities:
capturing, via the escrow user account, the further learning progress information until the full user account is registered at the external learning platform.

3. The method according to claim 1, further comprising:
registering the end user of the cloud computing platform as the full user account with the external learning application of the external learning platform;
receiving, at an API gateway, a notification that the end user has registered the full user account with the external learning application of the external learning platform;
retrieving the learning progress information for the end user that has been maintained at the escrow user account; and
capturing, via the full user account, any further learning progress information that happens after the end user registers as the full user account of the external learning platform.

4. The method according to claim 3, wherein retrieving the learning progress information for the end user that has been maintained at the escrow user account comprises:
communicating a second request from the API gateway to the user service for learning progress information that is maintained at the escrow user account; and
returning, to the external learning application via the user service, an indication that the end user is signed up as a fully registered user with the full user account with along with learning progress information that was maintained at the escrow user account to the external learning platform.

5. The method according to claim 1, Wherein the escrow user account is not created until there is a need to persist learning progress of the end user, and wherein the escrow user account persists the learning progress information of the end user to track interaction with content of the external learning application as provided via the virtual learning entities at the cloud computing platform.

6. The method according to claim 1, wherein the learning progress information comprises one or more of:
status of completion of a learning module by the end user;
rewards earned by the end user for completion of a learning module;
one or more user interactions to be persisted that are indicative of learning progress; and
information regarding existing learning badges and points that the end user has earned.

7. The method according to claim 1, wherein the virtual learning entities provided by the cloud computing platform: provide a framework for integrating learning content and contextual user information from the external learning application, and describe a logical schema for learning content and contextual user information in the cloud computing platform.

8. A system for tracking learning progress of an end user of a cloud computing platform when the end user is not registered with an external learning platform that provides an external learning application without requiring the end user to register with the external learning application, the system comprising:
at least one hardware-based processor and memory, wherein the memory comprises processor-executable instructions encoded on a non-transient processor-readable media, wherein the processor-executable instructions, when executed by the processor, are configurable to cause:
generating learning progress information in response to user interaction with virtual learning entities provided at the cloud computing platform in the context of an application provided by the cloud computing platform while in an active web session, wherein the virtual learning entities represent content of the external learning application provided by the external learning platform, and wherein the external learning platform is external to the cloud computing platform;
receiving, at a user service of the external learning platform, a request to persist the learning progress information for the end user communicated from the cloud computing platform over a network when the user interaction in the context of the application generates the learning progress information; and
when the user service receives the request:
  determining, at the user service, that a corresponding user account does not exist at the external learning platform that corresponds to the end user;
  automatically provisioning an escrow user account that is associated with the end user at the external learning platform with an identity for the end user in the cloud computing platform; and
  persisting, at the escrow user account, the learning progress information of the end user; and
populating a full user account at the external learning platform with the learning progress information of the end user retrieved from the escrow user account when the end user registers the full user account with the external learning application.

9. The system according to claim 8, further comprising:
after the escrow user account is automatically provisioned:
establishing, via an API gateway of the external learning platform, a session with the user service; and
when there is a need to persist further learning progress information of the end user as the end user interacts with the virtual learning entities:
capturing, via the escrow user account, the further learning progress information until the full user account is registered at the external learning platform.

10. The system according to claim 8, the system further comprising:

registering the end user of the cloud computing platform as the full user account with the external learning application of the external learning platform;

receiving, at an API gateway, a notification that the end user has registered the full user account with the external learning application of the external learning platform;

retrieving the learning progress information for the end user that has been maintained at the escrow user account;

populating the full user account at the external learning platform with the learning progress information for the end user that was retrieved from the escrow user account; and capturing, via the full user account, any further learning progress information that happens after the end user registers as the full user account of the external learning platform.

11. The system according to claim 10, wherein retrieving the learning progress information for the end user that has been maintained at the escrow user account comprises:

communicating a second request from the API gateway to the user service for learning progress information that is maintained at the escrow user account; and returning, to the external learning application via the user service, an indication that the end user is signed up as a fully registered user with the full user account with along with learning progress information that was maintained at the escrow user account to the external learning platform.

12. The system according to claim 8, wherein the escrow user account is not created until there is a need to persist the learning progress of the end user, and wherein the escrow user account persists the learning progress information of the end user to track interaction with content of the external learning application as provided via the virtual learning entities at the cloud computing platform.

13. The system according to claim 8, wherein the learning progress information comprises one or more of:

status of completion of a learning module by the end user;

rewards earned by the end user for completion of a learning module;

one or more user interactions to be persisted that are indicative of learning progress; and information regarding existing learning badges and points that the end user has earned.

14. The system according to claim 8, wherein the virtual learning entities provided by the cloud computing platform: provide a framework for integrating learning content and contextual user information from the external learning application, and describe a logical schema for learning content and contextual user information in the cloud computing platform.

15. At least one non-transient computer-readable medium having instructions stored thereon that are configurable to cause at least one processor to perform a method for tracking learning progress of an end user of a cloud computing platform when the end user is not registered with an external learning platform that provides an external learning application without requiring the end user to register with the external learning application, the method comprising:

generating learning progress information in response to user interaction with virtual learning entities provided at the cloud computing platform in the context of an application provided by the cloud computing platform while in an active web session, wherein the virtual learning entities represent content of the external learning application provided by the external learning platform, and wherein the external learning platform is external to the cloud computing platform;

receiving, at a user service of the external learning platform, a request to persist the learning progress information for the end user communicated from the cloud computing platform over a network when the user interaction in the context of the application generates the learning progress information; and when the user service receives the request:

determining, at the user service, that a corresponding user account does not exist at the external learning platform that corresponds to the end user;

automatically provisioning an escrow user account that is associated with the end user at the external learning platform with an identity for the end user in the cloud computing platform; and persisting, at the escrow user account, the learning progress information of the end user; and populating a full user account at the external learning platform with the learning progress information of the end user retrieved from the escrow user account when the end user registers the full user account with the external learning application.

16. The non-transient computer-readable medium according to claim 15, further comprising:

after the escrow user account is automatically provisioned:

establishing, via an API gateway of the external learning platform, a session with the user service; and when there is a need to persist further learning progress information of the end user as the end user interacts with the with the virtual learning entities:

capturing, via the escrow user account, the further learning progress information until the full user account is registered at the external learning platform.

17. The non-transient computer-readable medium according to claim 15, further comprising:

registering the end user of the cloud computing platform as the full user account with the external learning application of the external learning platform;

receiving, at an API gateway, a notification that the end user has registered the full user account with the external learning application of the external learning platform;

retrieving the learning progress information for the end user that has been maintained at the escrow user account;

populating the full user account at the external learning platform with the learning progress information for the end user that was retrieved from the escrow user account; and capturing, via the full user account, any further learning progress information that happens after the end user registers as the full user account of the external learning platform.

18. The non-transient computer-readable medium according to claim 15, wherein the escrow user account is not created until there is a need to persist learning progress of the end user, and wherein the escrow user account persists the learning progress information of the end user to track interaction with content of the external learning application as provided via the virtual learning entities at the cloud computing platform.

19. The non-transient computer-readable medium according to claim 15, wherein the learning progress information comprises one or more of:

status of completion of a learning module by the end user;

rewards earned by the end user for completion of a learning module;

one or more user interactions to be persisted that are indicative of learning progress; and information regarding existing learning badges and points that the end user has earned.

20. The non-transient computer-readable medium according to claim 15, wherein the virtual learning entities provided by the cloud computing platform:

provide a framework for integrating learning content and contextual user information from the external learning application, and describe a logical schema for learning content and contextual user information in the cloud computing platform.

\* \* \* \* \*